United States Patent
Ramanathan et al.

(10) Patent No.: US 11,716,397 B1
(45) Date of Patent: *Aug. 1, 2023

(54) APPARATUSES, COMPUTER-IMPLEMENTED METHODS, AND COMPUTER PROGRAM PRODUCTS FOR IMPROVED MULTIUSER CHANNEL MANAGEMENT

(71) Applicant: WELLS FARGO BANK, N.A., San Francisco, CA (US)

(72) Inventors: Ramanathan Ramanathan, Bellevue, WA (US); Chris Theodore Kalaboukis, San Jose, CA (US); Andrew J. Garner, IV, State Road, NC (US); Abhijit Rao, Irvine, CA (US); Joon Maeng, Newcastle, WA (US); Andres J. Saenz, Redmond, WA (US); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,713

(22) Filed: Mar. 28, 2022

Related U.S. Application Data

(63) Continuation of application No. 17/083,090, filed on Oct. 28, 2020, now Pat. No. 11,323,523.

(51) Int. Cl.
*H04L 67/148* (2022.01)
*H04L 67/1097* (2022.01)
(Continued)

(52) U.S. Cl.
CPC ........ *H04L 67/148* (2013.01); *H04L 63/0892* (2013.01); *H04L 67/04* (2013.01);
(Continued)

(58) Field of Classification Search
CPC ... H04L 67/148; H04L 67/54; H04L 63/0892; H04L 67/04; H04L 67/1095; H04L 67/1097

See application file for complete search history.

(56) References Cited

U.S. PATENT DOCUMENTS

| 7,676,583 B2 | 3/2010 | Eaton et al. |
| 8,650,307 B2 | 2/2014 | Miller |

(Continued)

FOREIGN PATENT DOCUMENTS

| EP | 1316035 A1 | 6/2003 |
| WO | 02/13120 A1 | 2/2002 |

*Primary Examiner* — Nazia Naoreen
(74) *Attorney, Agent, or Firm* — Womble Bond Dickinson (US) LLP

(57) ABSTRACT

Embodiments of the present disclosure provide for improvements in managing connection channels for multiple associated users. As connection channel changes occur for one or more users, various connection channels are updated such that appropriate functionality is accessible as determined based on aspects of the connection channel change. Example embodiments provide for establishing, with an electronic data management system, a connection channel associated with processing a shared electronic data object, where the connection channel is established associated with a first user data object; and causing rendering of a user interface that provides access to first functionality via the electronic data management system, and receiving an indication of a connection channel change, and causing updated rendering, based on the connection channel change and in response to receiving the indication of the connection channel change, of the user interface to provide access to updated functionality via the electronic data management system.

20 Claims, 14 Drawing Sheets

(51) Int. Cl.
 *H04L 9/40* (2022.01)
 *H04L 67/1095* (2022.01)
 *H04L 67/54* (2022.01)
 *H04L 67/04* (2022.01)

(52) U.S. Cl.
 CPC ...... *H04L 67/1095* (2013.01); *H04L 67/1097* (2013.01); *H04L 67/54* (2022.05)

(56) References Cited

U.S. PATENT DOCUMENTS

| | | | |
|---|---|---|---|
| 8,881,250 | B2 | 11/2014 | Yefimov et al. |
| 9,300,663 | B2 | 3/2016 | McDonough et al. |
| 9,342,824 | B2 | 5/2016 | Rosko et al. |
| 9,374,426 | B2 | 6/2016 | Pahlavan et al. |
| 9,826,347 | B2 | 11/2017 | Larkin et al. |
| 9,864,628 | B2 * | 1/2018 | Wormaid ............... G06F 9/461 |
| 9,912,758 | B2 | 3/2018 | Allinson |
| 2002/0065912 | A1 | 5/2002 | Catchpole et al. |
| 2003/0084165 | A1 | 5/2003 | Kjellberg et al. |
| 2004/0143669 | A1 | 7/2004 | Zhao et al. |
| 2007/0247395 | A1 | 10/2007 | Barraclough et al. |
| 2009/0063690 | A1 * | 3/2009 | Verthein ................ H04L 67/14 709/228 |
| 2010/0115094 | A1 | 5/2010 | Hagendorf |
| 2014/0082136 | A1 * | 3/2014 | Garcia Puga ............. G06F 9/00 709/217 |
| 2014/0118619 | A1 | 5/2014 | Hagiwara et al. |
| 2015/0026057 | A1 | 1/2015 | Calman et al. |
| 2016/0036923 | A1 * | 2/2016 | Phanishayee ......... G06F 9/4856 709/217 |
| 2016/0182627 | A1 | 6/2016 | Navanageri et al. |
| 2017/0011483 | A1 | 1/2017 | Gatenio |
| 2017/0196034 | A1 | 7/2017 | Jung et al. |
| 2018/0284957 | A1 | 10/2018 | Afsari et al. |
| 2019/0166395 | A1 | 5/2019 | Li |
| 2020/0057602 | A1 | 2/2020 | Sarir et al. |
| 2020/0412775 | A1 | 12/2020 | Gunnalan et al. |

* cited by examiner

US 11,716,397 B1

APPARATUSES, COMPUTER-IMPLEMENTED METHODS, AND COMPUTER PROGRAM PRODUCTS FOR IMPROVED MULTIUSER CHANNEL MANAGEMENT

CROSS-REFERENCE TO RELATED APPLICATIONS

This application is a continuation of U.S. patent application Ser. No. 17/083,090, titled "Apparatuses, Computer-Implemented Methods, And Computer Program Products For Improved Multi-User Channel Management," filed Oct. 28, 2020, the contents of which are incorporated herein by reference in their entirety.

TECHNOLOGICAL FIELD

Embodiments of the present disclosure generally relate to managing transmission channels by which users associated with various devices access functionality of a system, and specifically to managing various device connection channels for engaging with various disparate devices through multiple connection channels.

BACKGROUND

Conventional computing systems rely on particular connection channels between particular devices to ensure that users experience continuity while accessing particular functionality of the computing system. In circumstances where one or more of such connection channels are closed or changed, such computing systems often fail to provide continuous functionality and/or a continuous user experience to the same user upon initiating a new connection channel. Additionally, these computing systems often fail to provide appropriate functionality to one or more users based on the connection channel change.

BRIEF SUMMARY

In general, embodiments of the present disclosure provided herein provide improved management of connection channels associated with various users and corresponding user devices. Other implementations for managing connection channels will be, or will become, apparent to one with skill in the art upon examination of the following figures and detailed description. It is intended that all such additional implementations be included within this description be within the scope of the disclosure, and be protected by the following claims.

In accordance with at least one aspect of the present disclosure, a computer-implemented method is provided. In some example embodiments, the example computer-implemented methods are implemented via any one or more computing devices embodied in hardware, software, firmware, and/or a combination thereof, as described herein. An example computer-implemented method includes establishing, with an electronic data management system, a connection channel associated with processing a shared electronic data object, wherein the connection channel is established associated with a first user data object. The example computer-implemented method further includes causing rendering of a user interface including one or more interface elements that provide access to first functionality via the electronic data management system. The example computer-implemented method further includes receiving an indication of a connection channel change. The example computer-implemented method further includes causing updated rendering, in response to receiving the indication of the connection channel change, of the user interface to comprise one or more second interface elements that provide access to updated functionality via the electronic data management system, wherein the updated functionality is based on the connection channel change.

Additionally or alternatively, in some embodiments of the example computer-implemented method, the example computer-implemented method further includes initiating the connection channel change with the electronic data management system by establishing a connection with a second connection channel associated with the first user data object.

Additionally or alternatively, in some embodiments of the example computer-implemented method, the example computer-implemented method further includes providing, to the electronic data management system, user authentication credentials associated with the first user data object.

Additionally or alternatively, in some embodiments of the example computer-implemented method, the connection channel is established associated with a first computing device and the connection channel change is associated with at least a second computing device, wherein the updated functionality utilizes at least a shared device capability performable by both the first computing device and the second computing device.

Additionally or alternatively, in some embodiments of the example computer-implemented method, the shared electronic data object is associated with a set of user-driven actions comprising a first user-driven action to be performed by a second user data object before a second user-driven action to be performed by the first user data object, wherein the indication of the connection channel change is associated with the second user data object, and wherein the updated functionality comprises functionality for performing the second user-driven action before the first user-driven action.

Additionally or alternatively, in some embodiments of the example computer-implemented method, the established connection channel is associated with a first computing device, and causing updated rendering, in response to receiving the indication of the connection channel change, of the user interface includes causing updated rendering of the user interface to comprise an alert indicating that a first device capability incapable of performance by the first computing device is preferred or required.

Additionally or alternatively, in some embodiments of the example computer-implemented method, the established connection channel is associated with a first computing device, and wherein the updated functionality is associated with at least one device aspect comprising at least one of a level of computing power associated with the first computing device, a level of network connectivity associated with the first computing device, a level of electronic security associated with the first computing device.

In accordance with another aspect of the present disclosure, an example apparatus is provided. In at least some embodiments of an example apparatus, the example apparatus includes at least one processor and at least one non-transitory memory having computer-coded instructions stored thereon. The memory in execution with the at least one processor configures the example apparatus to perform any one of the example computer-implemented methods described herein.

In accordance with yet another aspect of the disclosure, an example computer program product is provided. In at least some embodiments of an example computer program product, the example computer program product includes at least one non-transitory computer-readable storage medium having computer program code stored thereon that, upon execution, is configured for performing any one of the example computer-implemented methods described herein.

BRIEF DESCRIPTION OF THE DRAWINGS

Figure 1:
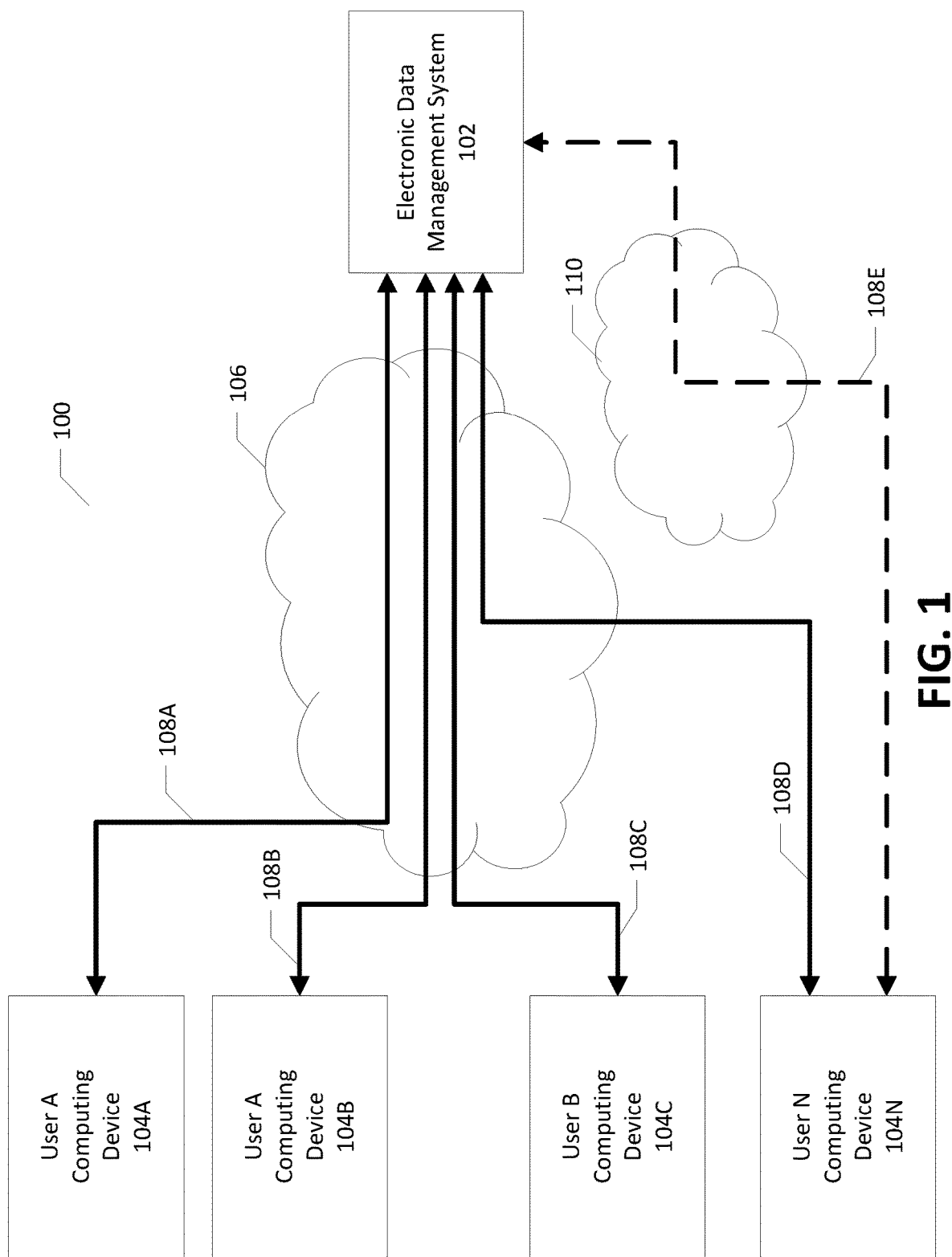
Figure 2:
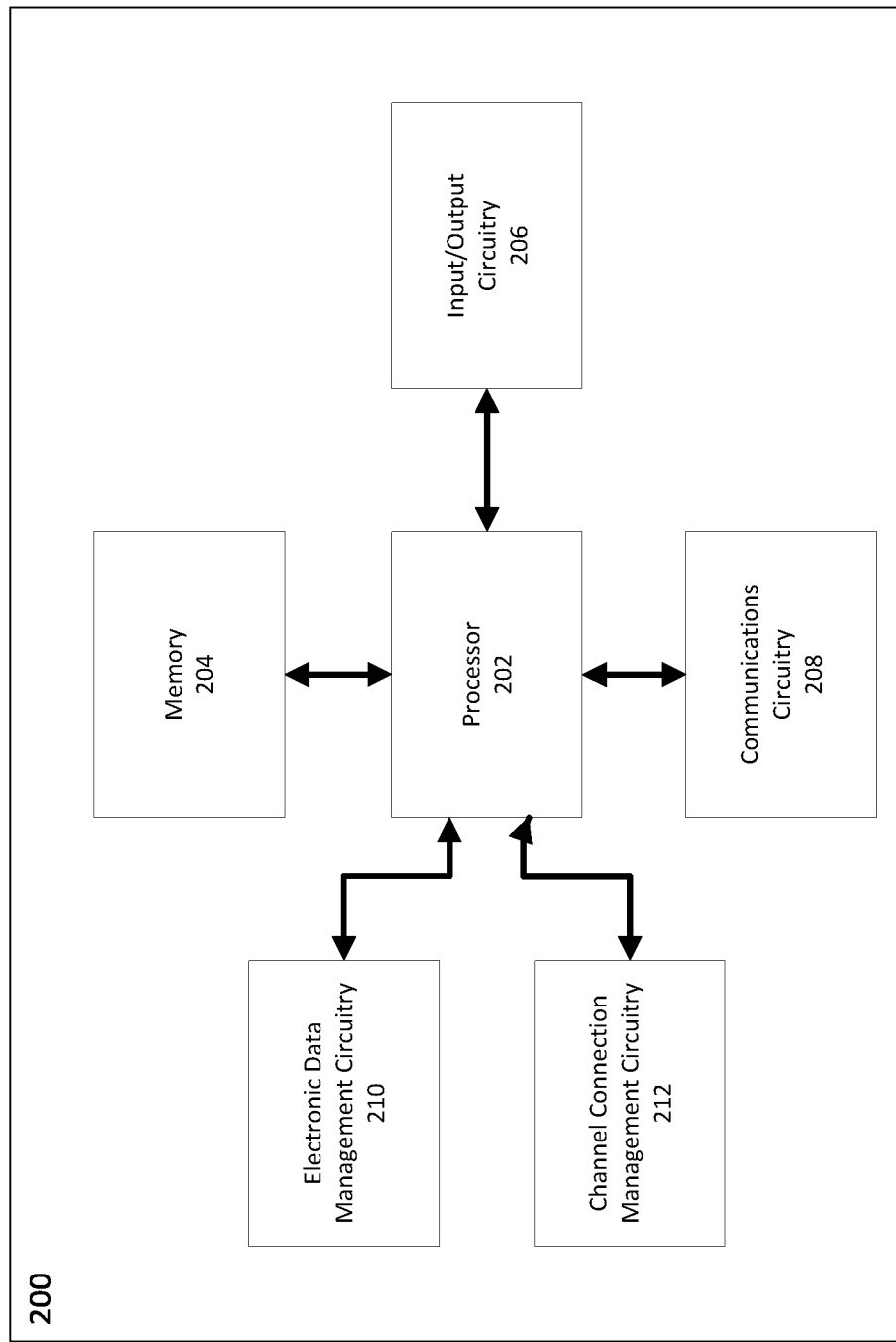
Figure 3:
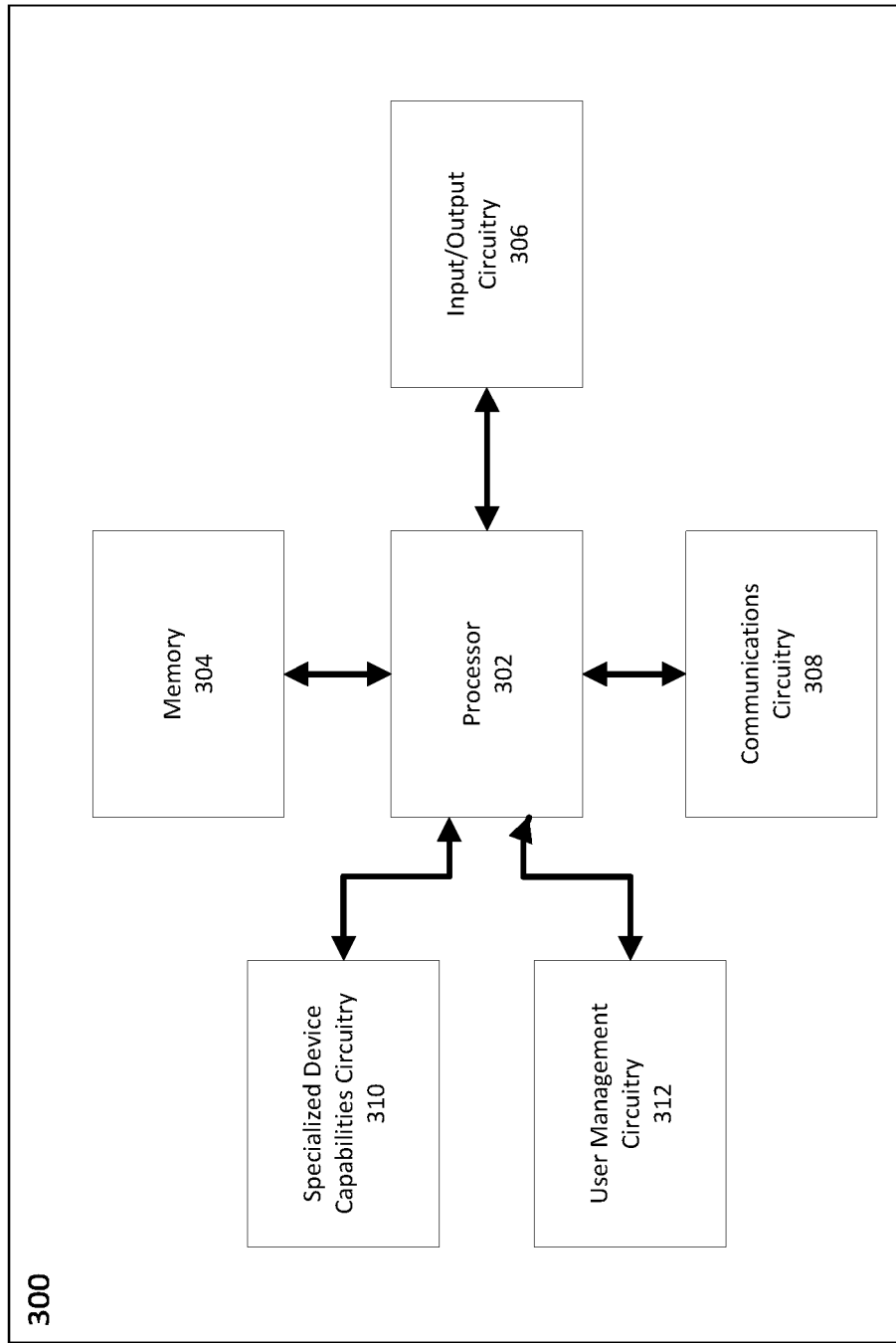
Figure 4:
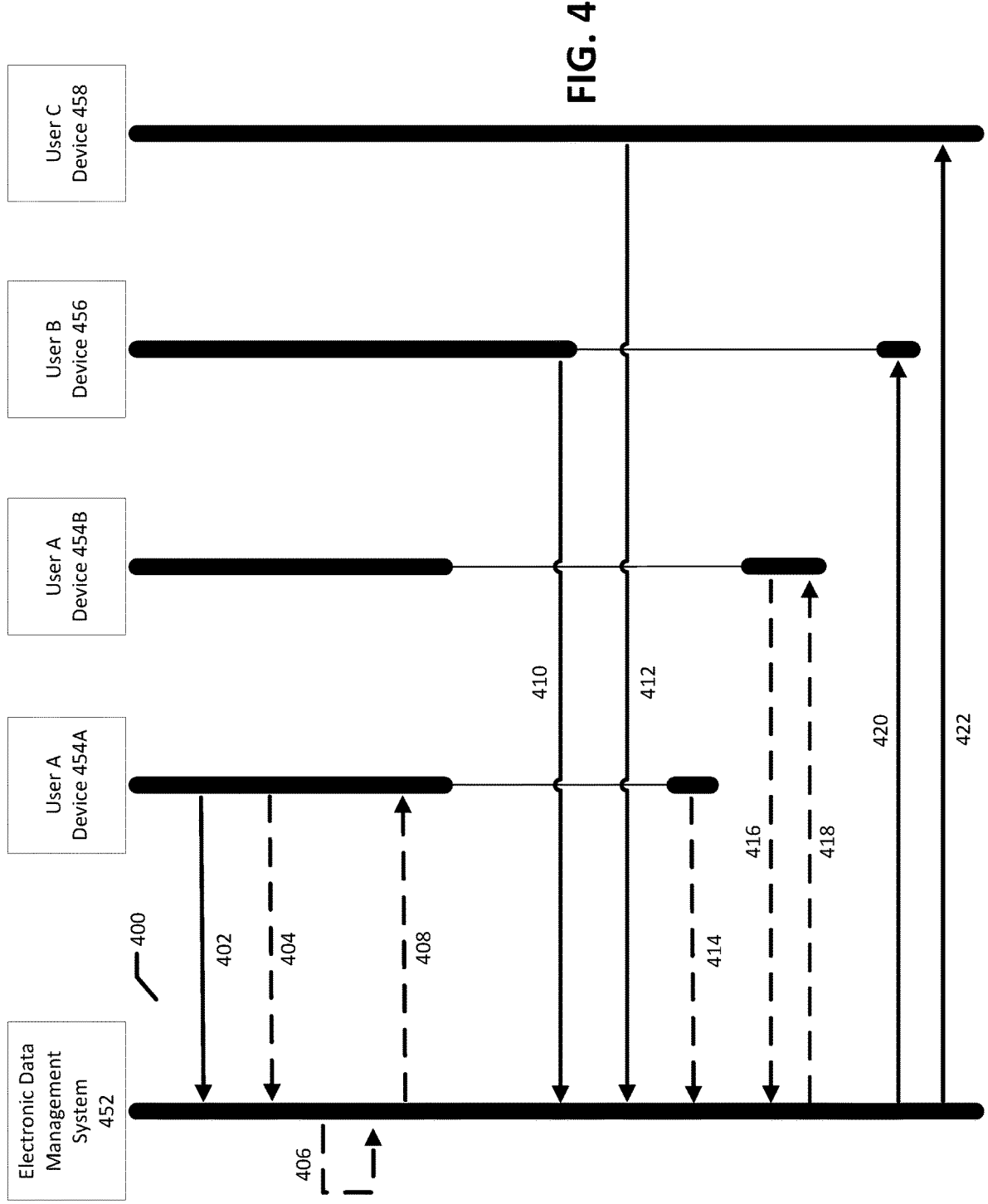
Figure 5:
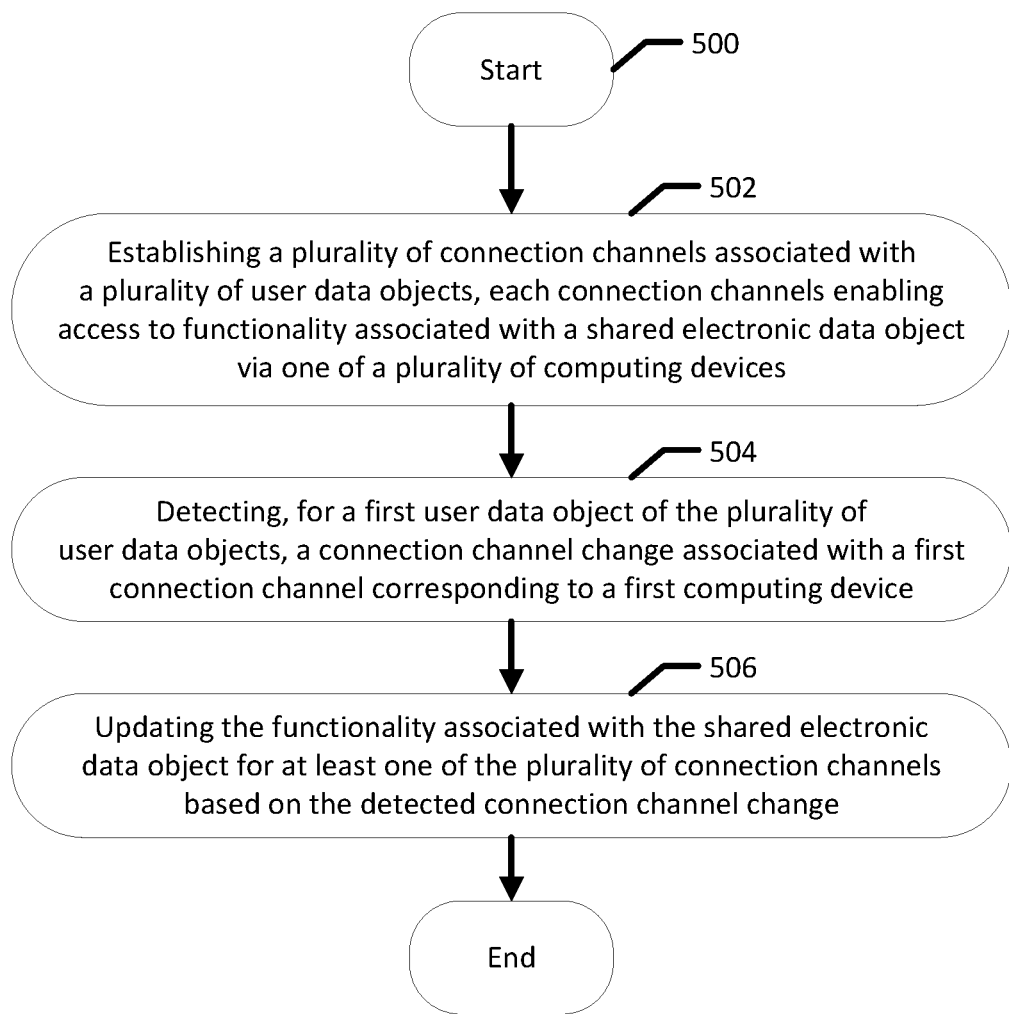
Figure 6:
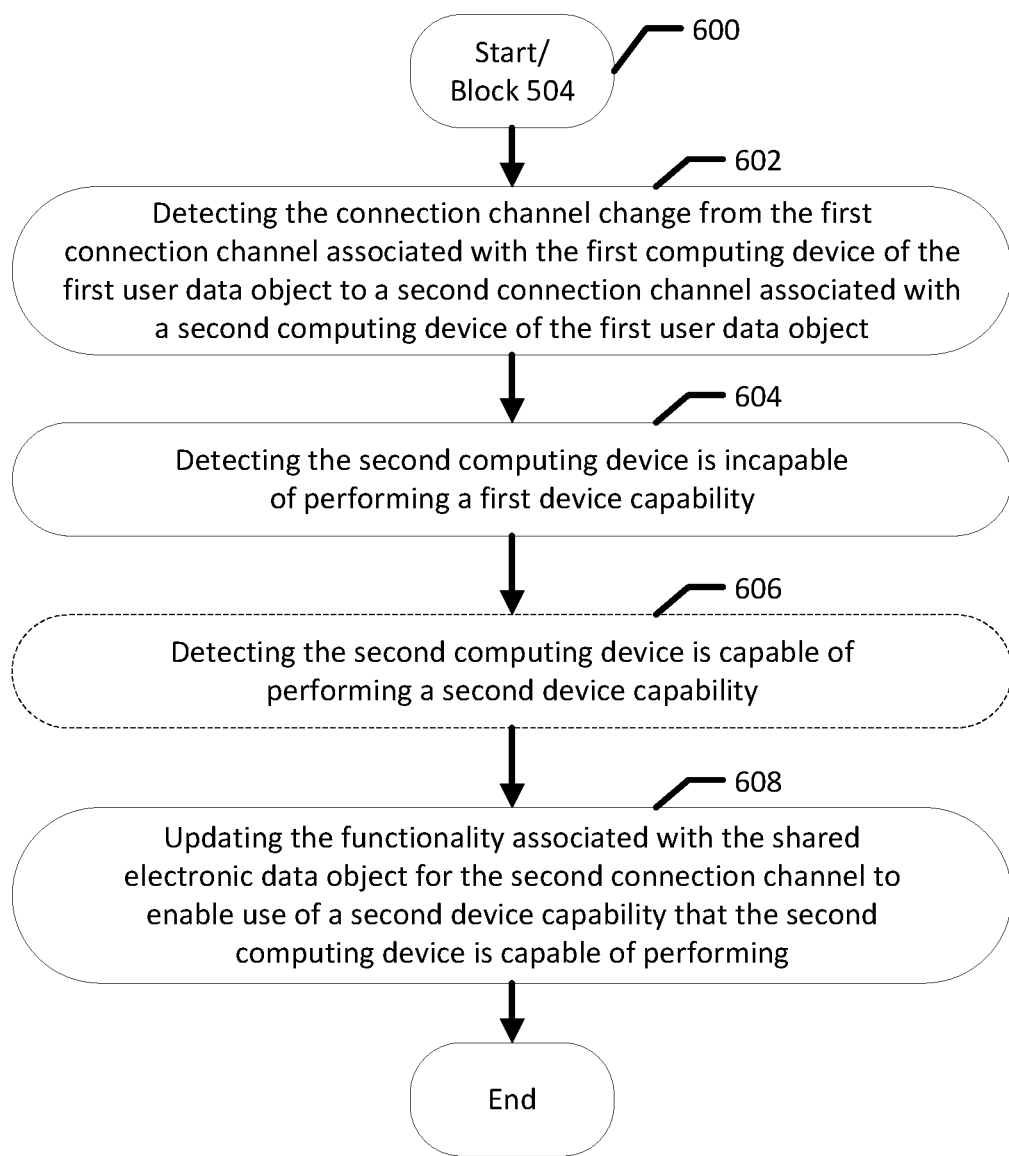
Figure 7:
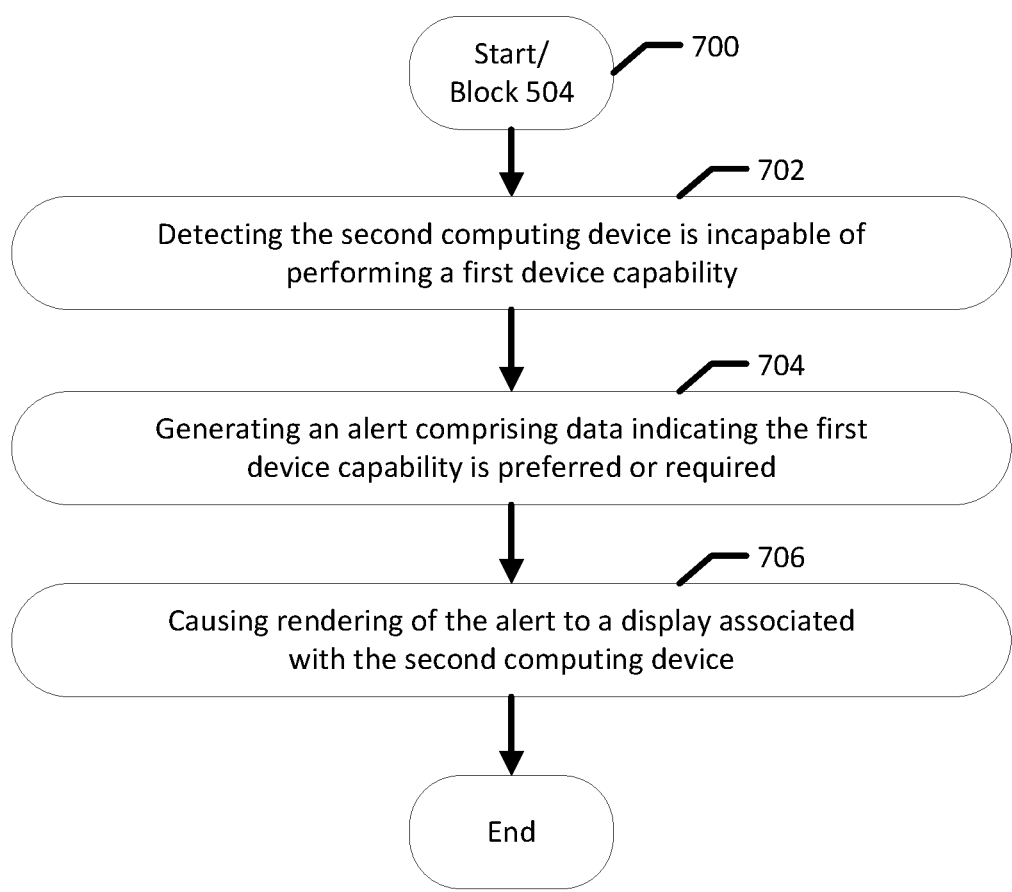
Figure 8:
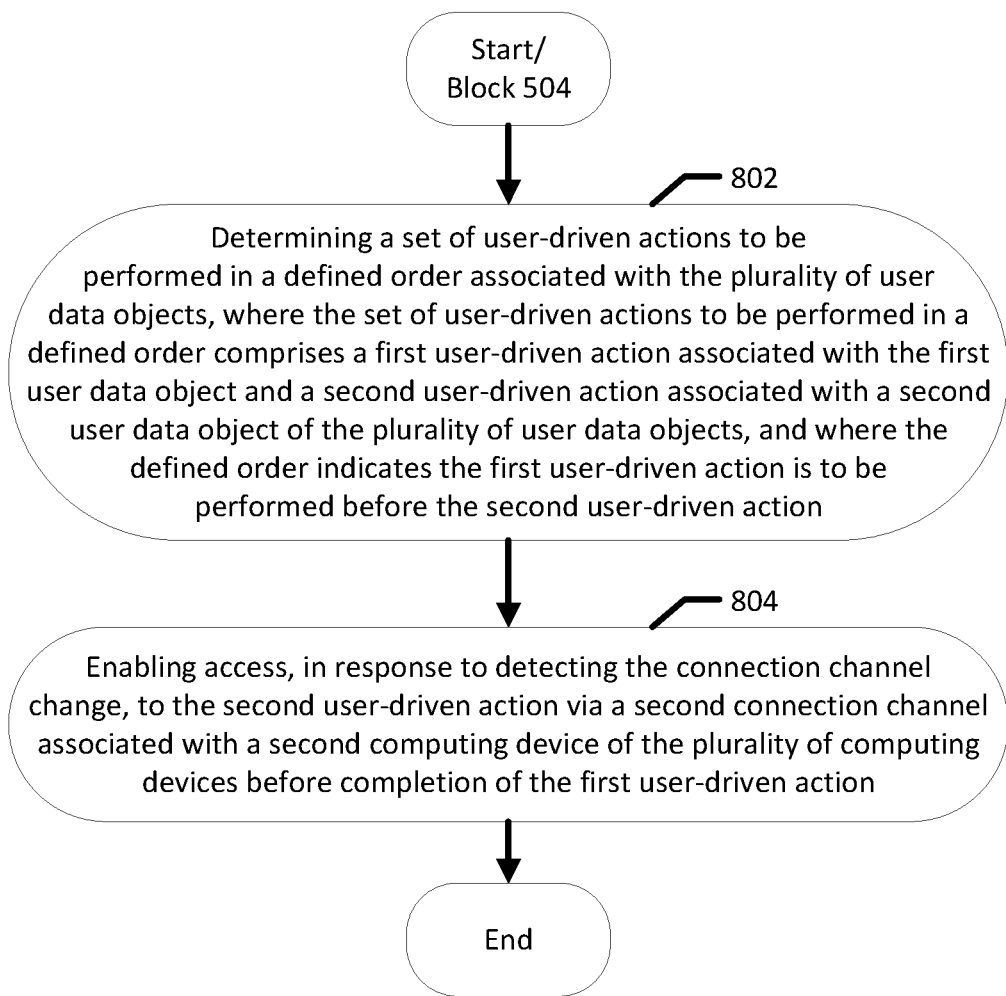
Figure 9A:
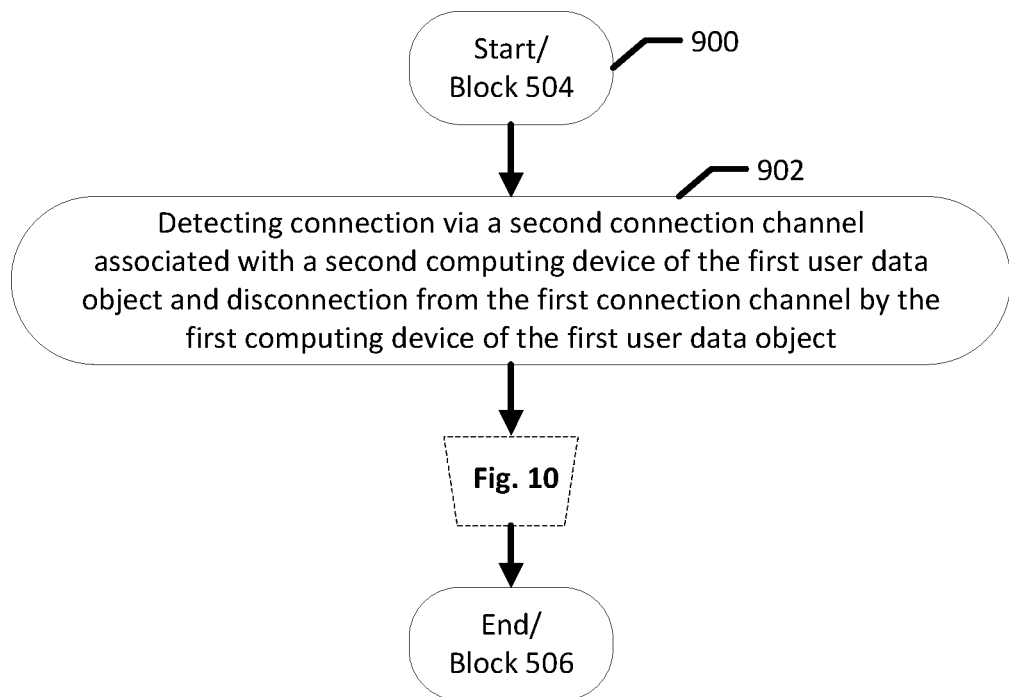
Figure 9B:
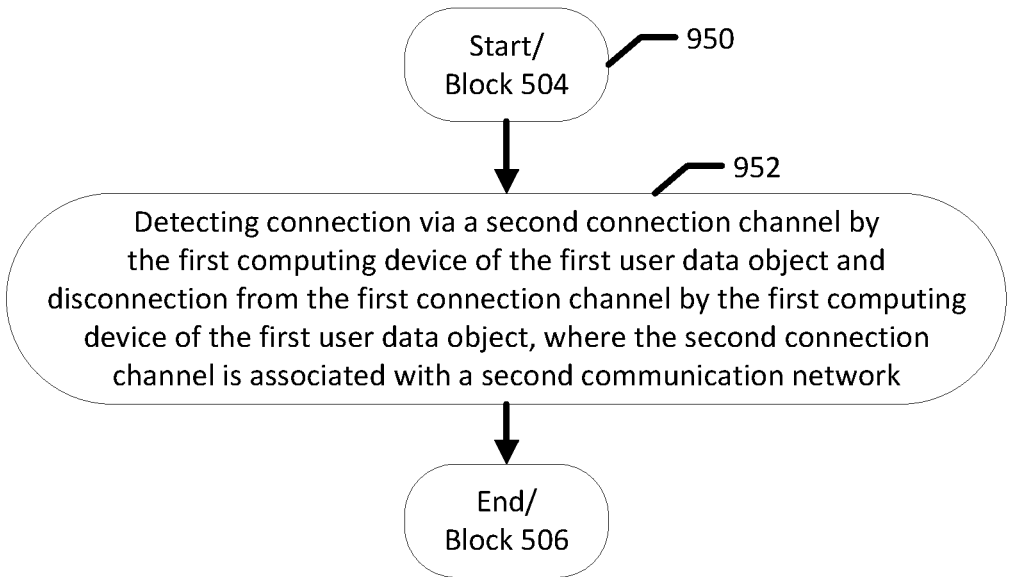
Figure 10:
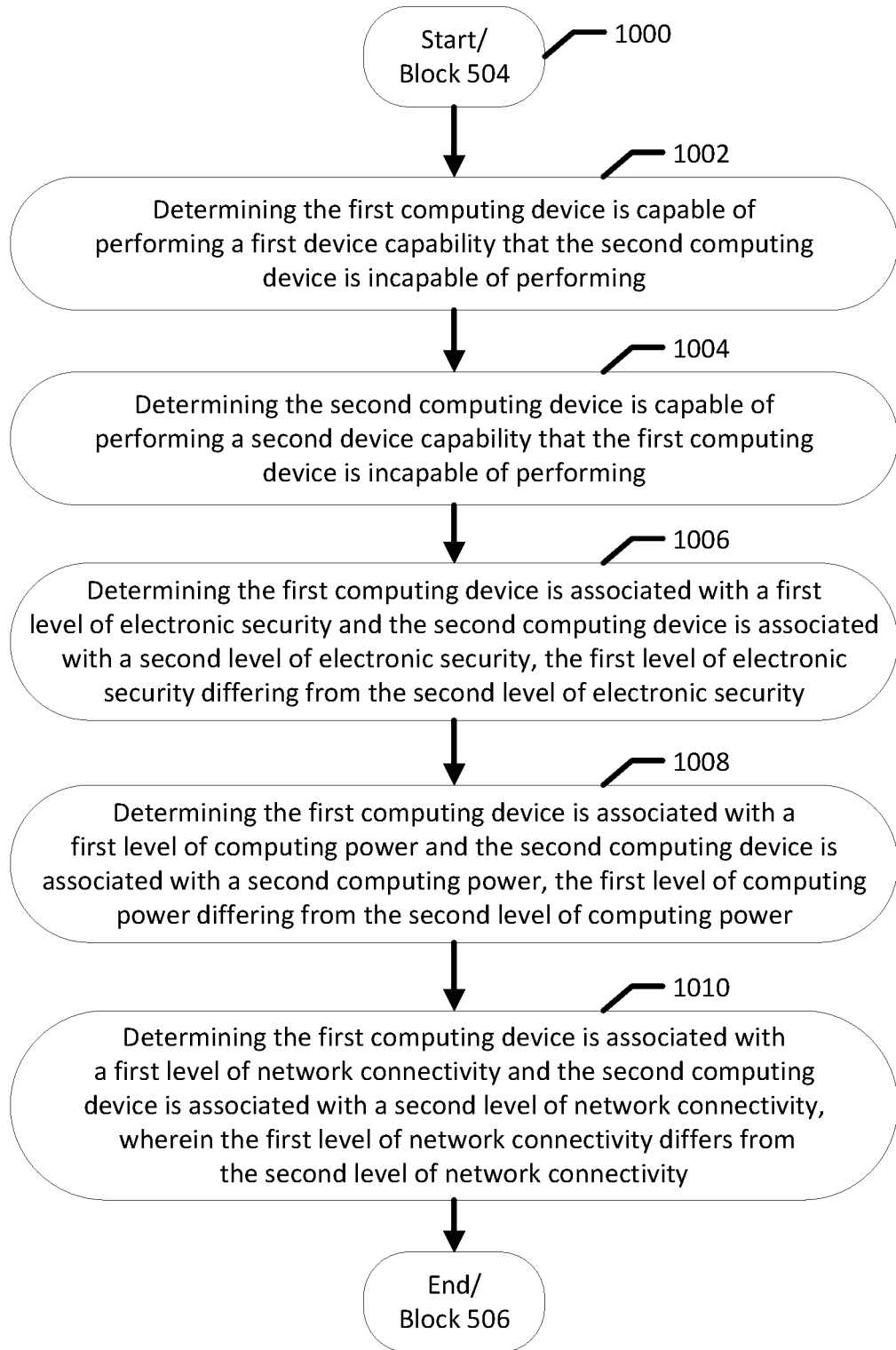
Figure 11:
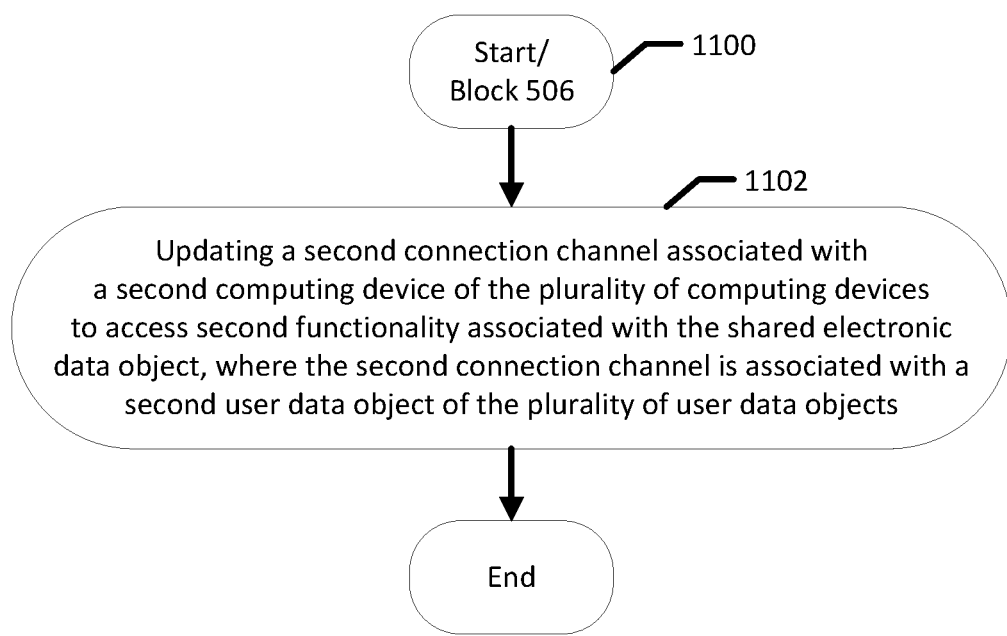
Figure 12:
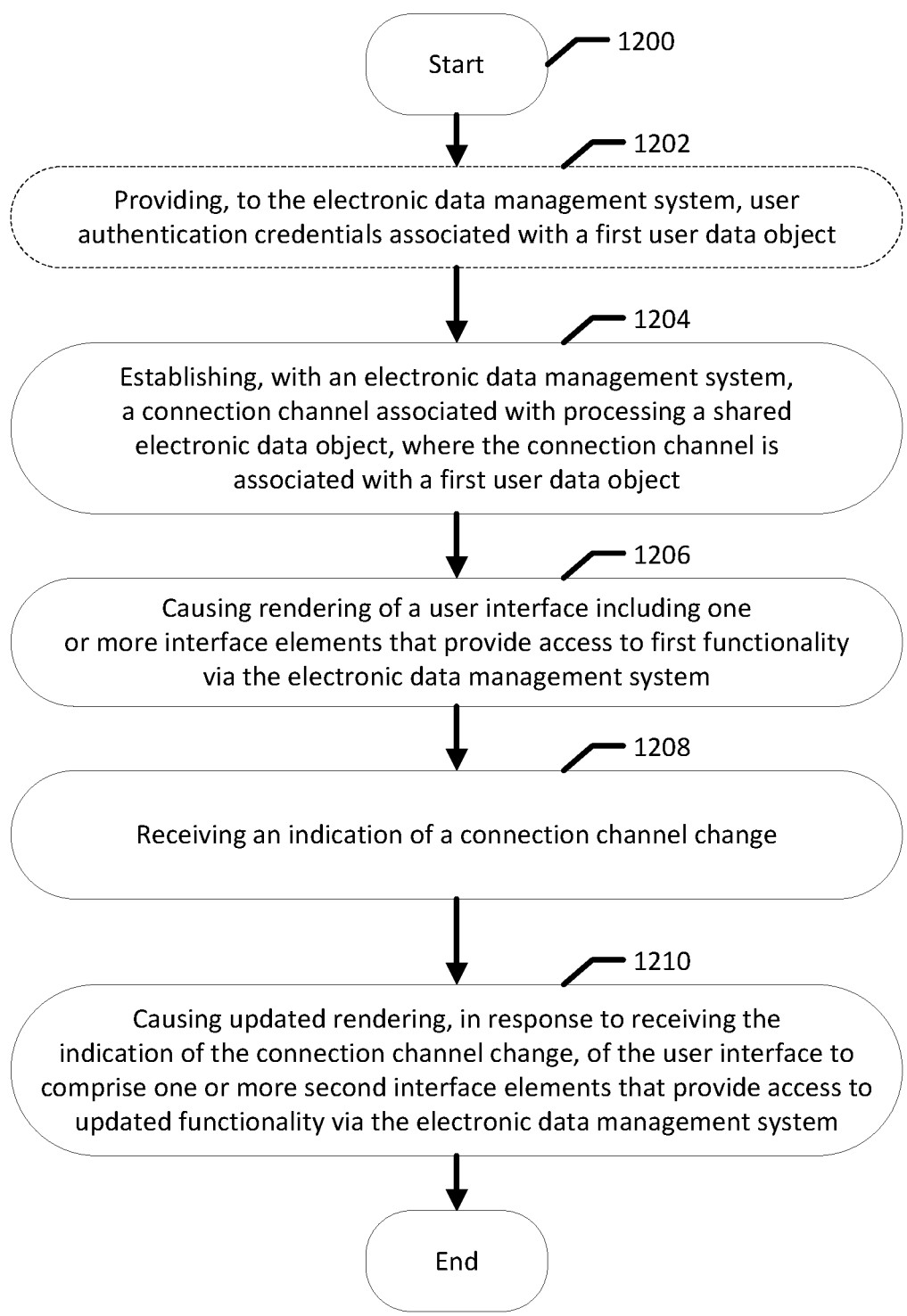
Figure 13:
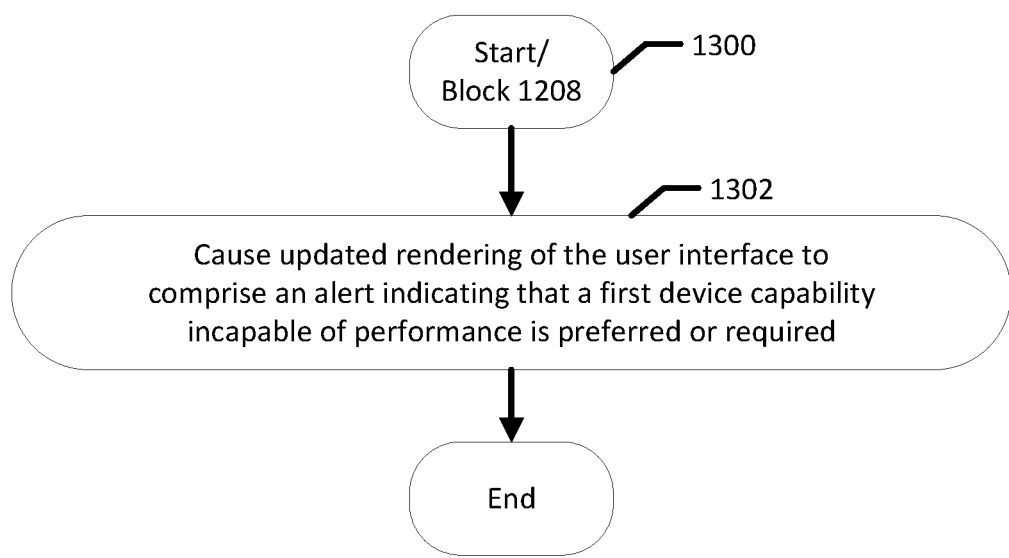
Figure 14:
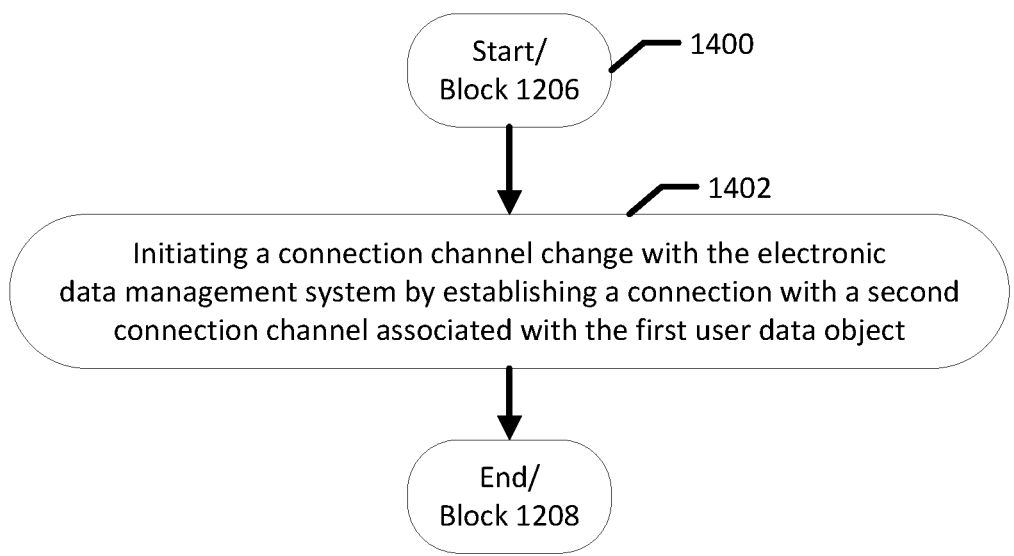

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus embodying an electronic data management system that may be specially configured in accordance with at least one example embodiment of the present disclosure FIG. 3 illustrates a block diagram of an example apparatus embodying a specialized computing device that may be specially configured in accordance with at least one example embodiment of the present disclosure;

FIG. 4 illustrates a data flow diagram depicting operations of an example system in accordance with at least one example embodiment of the present disclosure;

FIG. 5 illustrates a flowchart including operations of an example process for connection channel management in accordance with at least one example embodiment of the present disclosure;

FIG. 6 illustrates a flowchart including additional operations of an example process for connection channel management in accordance with at least one example embodiment of the present disclosure;

FIG. 7 illustrates a flowchart including additional operations of an example process for connection channel management in accordance with at least one example embodiment of the present disclosure;

FIG. 8 illustrates a flowchart including additional operations of an example process for connection channel management in accordance with at least one example embodiment of the present disclosure;

FIG. 9A illustrates a flowchart including additional operations of an example process for connection channel management in accordance with at least one example embodiment of the present disclosure;

FIG. 9B illustrates a flowchart including additional operations of an example process for connection channel management in accordance with at least one example embodiment of the present disclosure;

FIG. 10 illustrates a flowchart including additional operations of an example process for connection channel management in accordance with at least one example embodiment of the present disclosure;

FIG. 11 illustrates a flowchart including additional operations of an example process for connection channel management in accordance with at least one example embodiment of the present disclosure;

FIG. 12 illustrates another flowchart including operations of another example process for connection channel management in accordance with at least one example embodiment of the present disclosure;

FIG. 13 illustrates a flowchart including additional operations of another example process for connection channel management, in accordance with at least one example embodiment of the present disclosure; and FIG. 14 illustrates a flowchart including additional operations of another example process for connection channel management, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Users that interact with one or more systems comprising any number of systems, computing device(s), and/or the like (e.g., remote servers) to access various functionality often do so through use of a particular connection channel. In this regard, the user's computing device may be configured to enable access to functionality provided by the remote system by establishing and maintaining the connection channel with the remote system. In some contexts, a connection channel is established to facilitate an authenticated session associated with the user through their corresponding computing device. For example, the connection channel may be established upon authenticating user authentication credentials provided by the user to enable the remote system to associate, based on the user authentication credentials, a user data object with the connection channel with that user data object. The same user may utilize an additional computing device to establish a second connection channel with the remote system and access functionality provided by the remote system via the second computing device. However, such connection channels are conventionally maintained separately, such that user changes made associated with one connection channel do not influence the other connection channel. Similarly, other users may utilize their computing device(s) to establish one or more connection channel(s), each of which are independent and separate from other connection channels associated with the same user or other users. In this regard, the remote system may establish connection channel(s) with any number of user data object(s) via one or more computing device(s), and maintain such connection channel(s) such that it is independent of changes made in any of the remaining connection channel(s).

In some contexts, users utilize such connection channel(s) to access, manage, and/or otherwise perform one or more operation(s) associated with electronic data object(s) maintained by the remote system. One or more of such electric data object(s) may be associated with and/or shared with a plurality of user data object(s), such that connection channel(s) corresponding to each of the user data object(s) associated with a particular shared electronic data object enable access to various functionality to be performed by such users. For example, each user data object may utilize one or more connection channel(s) for the user data object to perform electronic authorization(s) associated with a particular electronic document, communicate with other user(s), and/or the like. Each of the connection channel(s) may be specially configured to enable access to particular functionality, and/or more specifically a particular portion of functionality, of which a particular user data object may require use.

In many contexts, one or more user(s) are consistently changing the channels that the user utilizes for accessing such functionality. In some example contexts, a user utilizes a particular computing device to begin a connection channel for accessing such functionality. During such access, the user often changes their connection channel between the user's computing device (or computing devices of a particular user) and the remote system. For example, a user may at one or more moments change communication networks utilized to access the remote computing device(s), such as by going from a wired connection to a wireless connection, changing to a different wireless communication network, and/or changing wireless communication mechanisms altogether (e.g., changing from Wi-Fi to cellular network communications).

Conventional systems fail to handle such changes in communication channel in a way that maintains the desirable functionality and/or user experience for the user or users associated with user data objects similarly associated with a particular shared electronic data object. For example, when user actions result in and/or cause a change in the connection channel a particular user is utilizing for accessing the remote system, updates and/or actions performed via an earlier connection channel are commonly lost in conventional systems. Additionally or alternatively, a user may change to a connection channel that does not facilitate access to functionality that utilizes appropriate, recommended, and/or necessary capabilities of the computing device currently being utilized by the user.

Such inconsistencies in user experience, data corruption, and/or problems with accessing desired functionality are further exacerbated in circumstances where a user's change in connection channel effectuates a change for one or more other users associated with user data object(s) corresponding to connection channel(s). For example, in some contexts, a user's connection channel change results in the inability of that user to utilize one or more device capabilities to perform an action with respect to a shared electronic data object that is needed before one or more other users may take further action(s) associated with that shared electronic data object. In one example context, for a particular shared electronic data object, an electronic authorization action may be sought associated with a particular user data object before further electronic authorization actions from other user data object(s) are sought. In a circumstance where the user undergoes a connection channel change and no longer can access certain functionality needed or recommended for providing the electronic authorization action, it may be advantageous to alter functionality accessible to the other users (e.g., update their connection channels to enable these users to access functionality for performing their electronic authorization actions before the other user). Alternatively or additionally, the connection channel change for a particular user may enable use of one or more particular device capabilities performable on a newly accessed device, and/or capabilities that are shared across all user devices of user data object(s) associated with a particular shared electronic data object. By failing to provide user experience continuity and preferable functionality access, conventional systems fail to provide a consistent and effective user experience for an individual user. Similarly, by keeping the connection channel for any particular one of a plurality of user data objects entirely independent without accounting for the effects of connection channel change(s) associated with one or more other user(s) similarly associated with a particular electronic data object, conventional systems fail to provide consistent and effective user experiences for a plurality of users as they each interact with the remote system.

One example context of the technical difficulties resulting from conventional management of connection channel(s) (or in some examples a lack thereof) is in the context of digital transaction processing and/or financial application management via financial systems. In this example context, a user may begin operations of a particular transaction (e.g., a loan application, mortgage application, account opening application, or the like) via the financial system, then change their connection channel on the same device or to a new device. Due to the connection change, some conventional systems fail to persistently maintain the effects of the user-performed operations, and thus the user may lose the effects of their previously performed operations and need to repeat them via the new connection channel. Alternatively, some conventional systems utilize reference numbers or similar options that allow a user to manually access the operations from where they left off, however this requires additional actions by the user.

In this example context, additional problems result in the context of multi-user connection management. For example, multiple users may be jointly performing one or more transactions such that each of the users must perform one or more specific operations to complete the transaction. One specific example of a transaction is processing of a loan application on behalf of a company (e.g., by officers or members of an LLC). The transaction may require the users perform various operations in a particular defined order, a random order, a sequential order, an order of states including one or more operations, or the like (e.g., stage one including an electronic signature by User A and an electronic signature by User B, then stage two including processing by an associated financial institution, then stage three including electronic signature by User C). When a user changes their connection channel, it may thus be desirable to update one or more facets of another user's connection channel based on the change. For example, by changing connection channel, the user may no longer be able to securely perform operations associated with the transaction (e.g., securely transmit electronic authorization(s), upload documents, or the like), and it may be desirable to enable the other users to perform one or more operations out of turn while waiting for the other user to return to a suitable connection channel for performing the next operation. Alternatively or additionally, by changing connection channel, the user may no longer have access to one or more particular, required, or preferable device capability and/or functionality required or preferred for performing one or more operations of the transaction. In some such circumstances, it is desirable to update the functionality accessible via the connection channel(s) for the remaining user(s) (e.g., to match the functionality performable by the user that underwent the connection channel change). Alternatively or additionally, in some such circumstances it is desirable to update the connection channel(s) for the remaining users in any of a myriad of manners based on the connection channel change, for example to ensure that each user performs actions utilizing the same functionality and/or device capabilities, and/or to reorganize an order of operations to be performed. As conventional systems often maintain connection channel(s) independently, both for a single user and for multiple users associated with a single electronic data object, transaction, process, and/or the like, such conventional systems fail to provide this desirable consistency in multi-user connection channel management.

Conventional systems similarly fail to provide the technical advantages resulting from such improved multi-user connection channel management, such as enabling a consistent user experience, improving overall efficiency of transaction completion, and enabling consistent multi-user connection channel management without additional user interactions.

Embodiments of the present disclosure are provided to address each and/or all of the problems arising out of the deficient technical nature of conventional systems. Indeed, the embodiments of the present disclosure provide various technical improvements in the technical field of multi-user communication channel management. In this regard, embodiments of the present disclosure provide improved user experience consistency as a user regardless of connection channel change(s) performed by the user. Additionally or alternatively, embodiments of the present disclosure further provide improvements in managing multiple associated connection channel(s), such as connection channel(s) for a plurality of user data objects each associated with a particular shared electronic data object. For example, as one or more connection channel change(s) are detected for user data objects corresponding to associated users, embodiments update any number of connection channel(s) associated with other user data objects to ensure that such connection channel(s) provide access to proper functionality based on the connection channel change. In one example context, for example, when a connection channel change occurs for a user data object that results in newly available device capability/capabilities recommended, preferred, and/or needed to utilize particular functionality provided by such embodiments with respect to a shared electronic data object, and/or results in loss of an available device capability/capabilities recommended, preferred, and/or needed to utilize particular functionality provided by such embodiments with respect to the shared electronic data object, one or more connection channel(s) for other user data object(s) associated with the shared electronic data object is updated to ensure appropriate functionality and/or preferential functionality is accessible via such connection channel(s).

Embodiments of the present disclosure thus provide improvements to maintaining connection channels associated with various user data object(s) and/or computing devices of such user data objects. In this regard, such embodiments provide consistency in a particular user's experience across multiple communication channel's and/or computing devices in a manner not achievable by conventional systems. Additionally or alternatively, such embodiments provide improvements in the field of managing connection channels for a plurality of users by at least ensuring access to appropriate functionality as each of the users maintains and/or changes their respective connection channel without requiring any additional interaction by any of the other users. By ensuring appropriate functionality remains available to particular users despite changes in another user's connection channel, embodiments provide for a consistent and preferable user experience, and in some circumstances are better optimized to allow for a particular set of actions to continue to be performed despite changes in the connection channel(s) of one or more users associated with the set of actions. For example, should a first user change their connection channel and no longer have access to functionality and/or a device capability required or preferred for performing a next step in a defined order of actions, at least some embodiments herein enable functionality such that other users may perform subsequent actions before the first user to maintain a consistent workflow. In some such embodiments, as another improvement to maintain an inherent level of security and/or procedural requirements due to the defined order of user actions to be performed, some such embodiments may undo the effects of the actions taken out of turn at a particular stage to void or otherwise rollback the actions taken out of turn.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly describe herein are also contemplated as may be set forth in some of the appended claims. Although specific terms are employed herein, they are used in a generic and descriptive sense only and not for purposes of limitation.

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The terms "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

The term "example" is used herein to mean "serving as an example, instance, or illustration." Any implementation described herein as "example" is not necessarily to be construed as preferred or advantageous over other implementations.

The terms "computer-readable medium" and "memory" refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" refers to any computer embodied in hardware, software, firmware, and/or any combination thereof. Non-limiting examples of computing devices include a personal computer, a server, a laptop, a mobile device, a smartphone, a fixed terminal, a personal digital assistant ("PDA"), a kiosk, a custom-hardware device, a wearable device, a smart home device, an Internet-of-Things ("IoT") enabled device, and a network-linked computing device.

The term "user" refers to any entity utilizing a computing device. Non-limiting examples of a user include a human operator, automatic executing software, and a business entity operating through one or more agent(s).

The term "user data object" refers to electronically managed data representing a use within a computing environment. In some embodiments, a user data object includes or embodies a user profile for a particular user. In some embodiments, a user data object includes or embodies a user identifier that uniquely identifies a particular user within a computing environment. In some embodiments, a user data object is associated with user authentication credentials that enables a user to authenticate themselves as associated with or otherwise having access to the user data object and initiate an authenticated connection via a connection channel with another computing device, server, or the like, from a computing device associated with the user (e.g., initiate a session with a server from the user's smartphone). By way of example, a user data object embodies or otherwise includes a natural person identifier, a governmentally assigned identifier (e.g., a social security number), a universal identifier, and/or another identifier that uniquely identifies a user within the scope of a particular system.

The term "device capability" refers to one or more software, hardware, and/or firmware driven functions for performance by a computing device utilizing the software, hardware, and/or firmware. Non-limiting examples of device capability include accessing functionality provided by a particular application, configuration for utilizing specialized component functionality (e.g., voice commands requiring a microphone or other vocal-input mechanisms, facial recognition utilizing camera module(s) and/or other projection and/or image capture mechanisms, and/or the like), and/or inclusion of such specialized components. In some example embodiments, a particular computing device is configured for performing any number of a myriad of device capabilities, and/or is not configured for performing any number of any other of a myriad of device capabilities.

The term "electronic security" refers to one or more configurations and/or device capabilities associated with providing electronic data security on a computing device and/or associated with network communications directed to and/or from the computing device. In some embodiments, electronic security is provided by one or more physical components of a computing device. Additionally or alternatively, in some embodiments, electronic security is provided by software-based and/or firmware-based data security.

The term "level of electronic security" refers to an electronically-based determination of the sufficiency of electronic security for a certain computing device, which can be represented in any of a myriad of quantitative and/or qualitative manners. In some embodiments, a level of electronic security is predetermined based on device type, the existence and/or configuration of one or more hardware component(s), the existence and/or configuration of one or more software application(s), the existence and/or configuration of one or more firmware application(s), and/or a combination thereof. In some embodiments, a level of electronic security is represented by predetermined discrete values (e.g., "insecure"/"moderately secure"/"highly secure" or "level 1" being least secure and "level 5" being most secure) or is represented by a numerical value on a predefined scale (e.g., 1 to 10 with 1 being least secure and 10 being most secure). In some example embodiments, a level of security associated with a particular computing device is variable based on a myriad of factors associated with the computing device-including hardware of the computing device, software applications installed and/or executing on the computing device, configurations of one or more applications executing on the computing device, and/or any combination thereof.

The term "level of computing power" refers to one or more indications of the computing resources made available to a computing device. Non-limiting examples of computing power include an amount of processing power, an amount of memory storage space, and/or the like. In some embodiments, computing power available for use by a particular computing device is variable based on one or more factors. For example, in some example embodiments, the computing power available to a computing device varies based on the hardware of the computing device, applications and/or operations executing via the hardware of the computing device, executing operations associated with other computing devices, and/or any combination thereof. For example, in some embodiments, a computing device is bottlenecked by one or more types of computing power being weaker than a second part of computing power (e.g., networking computing power falling below processing computing power). In some example contexts, such bottlenecks and/or other limitations on portions of available computing power occur either temporarily or permanently based on hardware, software, firmware, and/or a combination thereof for a particular computing device.

The term "level of network connectivity" refers to one or more indications of a networking communication speed and/or quality associated with a computing device for receiving transmissions and/or sending transmissions over one or more communication network(s). In some example embodiments, network connectivity available to a computing device is variable based on one or more factors. In some example embodiments, for example, network connectivity available to a particular computing device is variable based on the configuration of devices defining a communications network, the network architecture of a communication network utilized by the computing device for communication, hardware, software, firmware, and/or a combination thereof of the computing device itself, physical connectivity factors (e.g., distance between a computing device and a second computing device facilitating connection to a communications network, interference between such computing devices, and the like), applications and/or operations executing via the computing device, and/or other factors local to the computing device.

The term "communication network" refers to one or more device(s), tower(s), base station(s), and/or other computing devices associated with one or more entity/entities that enables transmission of data between computing devices across space. Non-limiting examples of a communication network include the Internet, private networks (e.g., a local area connection), and a hybrid network. It should be appreciated that, in some embodiments, a communication network functions based on one or more communication protocols. Non-limiting examples of a communication protocol include a Wi-Fi communications protocol, a Bluetooth communication protocol, a Near-field communication protocol, another radio frequency communication profile, and/or the like.

The term "connection channel" refers to hardware, software, and/or firmware components by which a user communicates with a particular computing device, such as a server. Non-limiting examples of a communication channel include a particular secure session between a first computing device and a second computing device over a particular communication network and/or subset thereof (e.g., a communication session between a user's computing device and a server computing device over a Wi-Fi network maintained by the user, or a communication session between a user's computing device and a server computing device over a cellular network maintained by a third-party cellular service provider).

The term "connection channel change" refers to a change from one connection channel utilized by a user for accessing certain functionality provided by a computing device, such as a server computing device, to a second connection channel utilized by the user for accessing the functionality provided by the computing device. As described herein, connection channel changes occur in any of a myriad of manners. In some embodiments, a connection channel change refers to a change from a first connection channel to a second connection channel associated with the same computing device. In some embodiments, a connection channel change refers to a change from a first connection channel associated with a first computing device to a second connection channel associated with a second computing device.

The term "shared electronic data object" refers to electronically managed data that is associated with any number of user data objects. In some contexts, one or more computing devices maintains a shared electronic data object such that the shared electronic data object is accessible to the user data objects associated with the shared electronic data object. In some embodiments, for example, a shared electronic data object is generated and/or otherwise maintained for access and/or manipulation by one or more user(s) corresponding to the user data object(s) associated with the shared electronic data object. Non-limiting examples of shared electronic data objects include data objects representing electronically-maintained documents, data records, and/or computing files.

The term "functionality" refers to, with respect to a shared electronic data object, the access to the shared electronic data object by a user associated with the shared electronic data object, and/or the manipulation(s) performed by the user associated with the shared electronic data object. In some embodiments, functionality is provided via one or more user interface(s) rendered to or by a computing device under control by a user via an application executed on and/or installed to the computing device, either alone or in conjunction with an associated server computing device (e.g., providing backend functionality over a communication network). In some example contexts, the term "functionality" refers to the ability to initiate and/or otherwise perform one or more user-driven action(s) as defined herein via a computing device controlled by the user.

The term "alert" refers to electronically managed data indicating information that may be rendered, via one or more corresponding interface elements, to a display of a computing device associated with a particular user data object.

The term "processing action" refers to one or more computer-implemented actions to be performed for successfully processing an electronic data object. In some embodiments, for example, a processing action updates one or more values associated with the electronic data object and/or associated data elements. In some embodiments, an electronic data object is associated with a set of processing actions required to successfully process the electronic data object. In some such embodiments, the processing actions are associated with a defined order, and/or partitioned into stages of processing actions that may each be performed in parallel, simultaneously, and/or with a defined sub-order. In one example context, for example processing financial services applications, processing action(s) for an electronic data object are performed to receive data submissions, provide necessary documentation for further processing, and/or processing subsequent processing of received data such as for completing a loan application, mortgage application, account opening request, and/or the like. Non-limiting examples of a processing actions include a user-driven action, an automatically-driven system action, and/or a hybrid action including automatic and user-driven portions.

The term "user-driven action" refers to one or more computer-implemented processes resulting from particular user input from a user associated with a particular user data object. Non-limiting examples of a user-driven action include, for example, providing electronic document signatures, authenticating one or more data object(s), and/or modifying (e.g., editing, creation, or deletion) of one or more data object(s) maintained by a computing device. In some embodiments, a user-driven action is associated with an action status that represents whether the user-driven action has not been initiated, is in progress, and/or has been completed, or other stages of completion.

The term "electronic authorization action" refers to a particular user-drive action that provides electronic data from a computing device associated with a user associated with authorization and/or approval of an electronic data object. Non-limiting examples of an electronic authorization action include one or more processes for receiving user input indicating user authorization of a particular electronic document (e.g., an e-signature, or corresponding digital signature), receiving a drawn user input signature, and/or other actions performed by a user using a computing device communicable over a connection to another computing device (e.g., a server computing device) over a particular connection channel.

The term "defined order" with respect to a set of user-driven actions refers to a determined flow, whether determined in real-time or at a previous time, by which user-driven actions are to occur. In some such example contexts, functionality for performing one or more user-driven actions is determinable based on the defined order and action statuses for such user-driven actions. In some example embodiments, for example, functionality for performing certain user-driven actions is not made available until one or more user-driven actions that are prerequisites to such subsequent user-driven actions are associated with an action status indicating that such prerequisite user-driven actions are complete.

Example System and System Operations

FIG. 1 illustrates a block diagram of an example system that may be specially configured within which embodiments of the present disclosure may operate. Specifically, FIG. 1 depicts an example system 100. The example system 100 includes a plurality of computing devices, including user computing devices 104A-104N (collectively "user computing devices 104") and electronic data management system 102. Each of the user computing devices 104 is communicable at least with the electronic data management system 102 over one or more communication networks. For example, as depicted, each of the user computing devices 104 is communicable with the electronic data management system 102 over a first communication network 106. Additionally or alternatively, in some embodiments, one or more of the user computing devices 104 are communicable with the electronic data management system 102 over an additional communication network. For example, as depicted, the user N computing device 104N is communicable with the electronic data management system 102 over the communication network 110.

In at least one example context, each of the user computing devices 104 embodies a computing device controlled by a particular user. Non-limiting examples of such user computing devices 104 include a user's mobile device (e.g., smartphone), tablet, personal computer, and/or the like. It should be appreciated that a particular user may control and/or otherwise be associated with any number of user computing devices. For example, as illustrated, user computing devices 104A and 104B are each associated with User A. In an example context, user computing device 104A embodies a smartphone owned, operated, and/or otherwise controlled by the User A, and user computing device 104B embodies a personal computer owned, operated, and/or otherwise controlled by the User A. In some example contexts, each of the user computing devices 104 is associated with any number of device capabilities. In this regard, in some embodiments, one or more of the computing devices 104 are configured to perform device capabilities that one or more other user computing devices of the user computing devices 104 is/are incapable of performing. In some contexts, one or more computing devices lack specialized and/or necessary hardware, software, firmware, and/or a combination thereof required for performing a particular device capability. For example, in some embodiments, user computing device 104A embodying a user's smartphone includes and/or is otherwise associated a camera module and/or corresponding hardware (e.g., image sensor(s), optical lens(es), illumination generator(s), and the like), firmware (e.g., for activating and/or otherwise controlling one or more image sensor(s), illumination generator(s), and/or the like), and/or software (e.g., for reading out from the image sensor(s), for processing captured image data, and/or the like) for performing camera capabilities such as image and/or video capture. The user computing device 104B embodying a user's personal computer may not include such a camera module, and thus be incapable of performing such capabilities. Various capabilities may be performable only by a portion of user devices, such as image capture capabilities, video capabilities, audio recording capabilities, teleconferencing capabilities, user-drawing capabilities, specialized peripheral capabilities, and/or the like.

The electronic data management system 102 includes hardware, software, and/or firmware for providing functionality associated with any of a number of electronic data objects, transaction processing operations, and/or the like. In some embodiments, the electronic data management system 102 is embodied by one or more server(s) and/or one or more database(s) configured to provide functionality to create, maintain, and/or otherwise process electronic data objects and/or associated transactions. In one example context, for example, the electronic data management system 102 comprises one or more server(s) and/or one or more database(s) associated with a financial institution that enables storage and/or associated maintenance of financial data objects (e.g., accounts, loan applications, mortgage applications, and/or the like), and/or enables performing operations associated with stored financial data objects. For example, in one such example context, the electronic data management system 102 enables multiple users to access functionality associated with completing a particular electronic data object, such as a multi-user loan application that requires multiple user transactions, such as a plurality of user-submitted electronic authorizations, before the application is successfully processed. In some embodiments, the electronic data management system 102 is remote from each of the user computing devices 104, and may be controlled by and/or otherwise associated with a different entity than those that control each of the user computing devices 104 (e.g., a particular business, financial institution, and/or the like). It should be appreciated that in some other contexts, the electronic data management system 102 embodies any other of a number of processing server(s) and/or database(s) that provides functionality for user by one or more users provisioned to access the electronic data management system 102.

In some embodiments, a computing device communicates with one or more other computing devices via a connection channel established with the other computing device(s). In some such embodiments, a computing device establishes a connection channel by performing an authentication process with the other computing device with which the connection channel is to be established. For example, in at least one example context, a computing device desiring to establish a connection channel with an electronic data management system 102, or other computing device, provides and/or otherwise communicates user authentication credentials to the electronic data management system 102 so that such user authentication credentials may be utilized to authenticate the user and/or associate the computing device accessed by the user with a particular user data object provisioned via the electronic data management system 102. Additionally or alternatively, in other embodiments, a computing device establishes a connection channel with another computing device without authentication, such as simply by requesting such a connection channel be established through a request transmission to the other computing device. Additionally or alternatively still, in yet other embodiments, one or more connection channel(s) are configured such that no additional user action is required to establish the connection channel.

In some contexts, an electronic data management system 102 (or other computing device) maintains a plurality of connection channels, each associated with a remote computing device communicable with the electronic data management system 102. As illustrated, for example, user computing device 104A is communicable with the electronic data management system 102 via the connection channel 108A, user computing device 104B is communicable with the electronic data management system 102 via the connection channel 108B, user computing device 104C is communicable with the electronic data management system 102 via the connection channel 108C, and user N computing device 104N is communicable with the electronic data management system 102 via the connection channel 108D. In some embodiments, each of the users (User A, User B, User N, and the like) are each provisioned for accessing certain functionality associated with the electronic data management system 102. For example, in some embodiments, the electronic data management system 102 maintains user data objects that are associated with and/or otherwise represent each of the users. Upon establishing a connection channel with a particular user computing device, in some embodiments the electronic data management system 102 associates the connection channel with the user data object for the corresponding user. As described herein, the corresponding user data object may be identified in any of a myriad of manners, such as based on validated user authentication data, based on identifying that the user computing device is linked to a particular user data object (e.g., based on IP, IMEI, and/or any other identifier that uniquely identifies a computing device), and/or the like.

In some embodiments, a user initiates and/or otherwise establishes a connection channel with the electronic data management system 102 by authenticating the user's identity with the electronic data management system 102. In some embodiments, the user utilizes their user computing device to submit user authentication credentials to the electronic data management system 102. The electronic data management system 102 attempts to authenticate the submitted user authentication credentials as associated with a particular user data object, for example by comparing the submitted user authentication credentials with stored user authentication credentials associated with the various user data objects provisioned for accessing the electronic data management system 102 to determine whether there is a match. In a circumstance where the electronic data management system 102 successful authenticates the user's identity as associated with a particular user data object, the electronic data management system 102 establishes a connection channel for facilitating communication between the user computing device for that user and the electronic data management system 102. In some such embodiments, the connection channel is established associated with the corresponding authenticated user data object for use in determining accessible functionality, identifying electronic data objects stored by the electronic data management system 102 that are accessible to the authenticated user data object, and/or for any of a myriad of related functions for interacting with the electronic data management system 102. In this regard, in some embodiments, each connection channel is maintained associated with a particular user data object and a particular computing device.

Additionally or alternatively, in some embodiments, one or more of the user computing devices 104 may undergo a change to a new connection channel utilized to communicate with the electronic data management system 102. For example, as illustrated, in some embodiments the user computing device 104N optionally changes their communication channel to a second connection channel 108E accessible via the user computing device 104N. As described herein, the connection channel change from the connection channel 108D to the connection channel 108E may result from any of a myriad of actions related to hardware, software, and/or firmware of or associated with the user computing device 104N. For example, in some embodiments, the connection channel change for user computing device 104N occurs and/or is detectable by the electronic data management system 102 in response to a change in the communication network accessed by the user computing device 104N and/or mechanism utilized to access said communication network via the user computing device 104N. One example context includes a circumstance where the user computing device 104N changes from a wired network connection to a wireless network connection, or changes from a first wireless network mechanism (e.g., Wi-Fi) to a second wireless network mechanism (e.g., cellular networking services). As illustrated for example, the first connection channel 108D enables communication with the electronic data management system 102 via a first communication network 106, such as a user's wireless network configured to provide access to the Internet, and the second connection channel 108E enables communication with the electronic data management system 102 via a second communication network 110, such as one or more cellular communication towers providing access to the Internet. In other contexts, a connection channel change results from termination of the first connection channel due to any of a myriad of software-driven actions, such as initiation of the second connection channel 108E (and/or termination of the first connection channel 108D), restarting one or more processes on the user computing device 104N, and/or the like.

In some embodiments, the electronic data management system 102 only maintains at most one connection channel associated with each user data object. In this regard, should User A for example utilize both user computing devices 104A and 104B, only one of the connection channels 108A or 108B is actively maintained at a particular time. It should be appreciated that the active connection channel may be determined and/or maintained based on any of a number of configurations, for example based on the most recently-initiated connection channel, based on the first-initiated connection channel, based on a preference hierarchy between the user computing device 104A and user computing device 104B (e.g., set by the electronic data management system 102 and/or by User A associated with the user computing devices 104A and 104B), and/or the like. In other embodiments, the electronic data management system 102 maintains any number of connection channel(s) for a particular user data object, which may establish a connection with any number of user computing devices associated with that user data object.

In some embodiments, each connection channel enables communication between the user computing devices 104 and the electronic data management system 102 through one or more communication network. For example, as illustrated, example communication networks include communication network 106 and communication network 110. In some embodiments, each communication channel includes any number of intermediary devices embodied in hardware, software, firmware, and/or any combination thereof. Such communication network(s) may each be configured to operate utilizing any of a myriad of networking protocols. For example, in some embodiments, one or more of the communications network 106 and/or communication network 110 include hardware, software, and/or firmware that enables communication via a Bluetooth communication connection, near-field communication connection, Wi-Fi communication connection, a radio frequency communication connection, a cellular communication connection, and/or the like, between a user computing device and the electronic data management system 102. In some embodiments, one or more of the communication network(s) 108 and 110 includes one or more base stations, relays, cell towers, intermediary processing servers and/or domain hosts, and/or associated connection wires and/or other associated physical connections. In some such contexts, the communication network includes one or more user-controlled devices facilitating access network to the communication network. For example, in some embodiments, the communication network 110 and/or communication network 106 includes a router, modem, relay, and/or other user-controlled network access device that facilitates access to a particular public, private, and/or hybrid network.

In some contexts, a connection change is initiated and/or otherwise detected when a user computing device changes communication network. For example, in an instance where a user changes their device over from a wired Internet connection to a wireless Internet connection, from a Wi-Fi Internet connection to a cellular Internet connection, and/or the like, a new connection channel may be established either automatically or in response to manual user actions (e.g., a subsequent user-initiated request submitted to the electronic data management system 102). In some embodiments where the electronic data management system 102 associates each user data object with a particular user data object, the electronic data management system 102 may update the connection channel associated with each user data object as such connection channel changes occur and are detected by the electronic data management system 102 to ensure that the connection channel associated with a particular user data object remains up to date.

Each of the user computing devices 104 may utilize the connection channel established with the electronic data management system 102 to access particular functionality provided by the electronic data management system 102. In some embodiments, for example, such functionality includes creating a new electronic data object to be associated with at least the user data object associated with the user data object for the corresponding connection channel, access to electronic data objects stored by the electronic data management system 102 that are also associated with the user data object for the corresponding connection channel, and/or functionality associated with processing the electronic data object. In some embodiments, for example where the electronic data management system 102 maintains shared electronic data objects associated with a plurality of user data objects, each of the user data objects may have access to different functionality associated with processing a shared electronic data object. As described herein, the accessible functionality for a particular user data object may be updated as the connection channel changes for one or more other users associated with the shared electronic data object.

In one example context, a particular shared electronic data object is associated with a specific set of processing actions in a defined order. The defined order may indicate the particular processing actions require performance in a particular order, a particular set of stages (e.g., where processing actions within a particular stage may be done in simultaneously, in a random order, at any time, or have a particular sub-order), and/or the like, such that accessible functionality is dependent on the status of other processing actions to be performed. In some such embodiments, the electronic data management system 102 determines the statuses of various processing actions to be performed associated with a particular shared electronic data object (e.g., by polling a persistent data storage embodied by and/or otherwise maintained by the electronic data management system 102), and enables access to particular functionality based on the determinized statuses of the various processing actions. For example, if processing a particular shared electronic data object is defined by a particular defined order having two steps requiring processing actions by User A and User B in a first step, then a processing action by User C in a second step, and User A has completed their processing action but User B has not, the electronic data management system 102 configures each of the connection channels associated with user data objects for Users A, B, and C such that User B can perform the required processing action, and Users A and C do not have functionality for performing any such steps as no processing actions are required from them at this time.

In some embodiments, the electronic data management system 102 updates one or more of the connection channel(s) for a particular user in response to processing actions performed by another user via another connection channel and/or connection channel change(s) by other user data object(s) associated with a shared electronic data object. As a user performs one or more processing actions, in some embodiments, the functionality accessible to the corresponding user data object and/or another user data object is updated to enable subsequent processing actions to occur. For example, in some embodiments, once a user completes the processing actions required for a particular step, the connection channel(s) are updated to enable functionality for performing subsequent processing actions of a next step. Alternatively or additionally, in some embodiments, the electronic data object management system updates one or more connection channel(s) in response to connection channel change(s) associated with other user data objects, as described herein. For example, in some embodiments, the electronic data management system 102 detects a connection channel change for a first user data object associated with a shared electronic data object and determines, based on the connection channel change, that connection channel(s) associated with one or more other user data objects similarly associated with the shared electronic data object should be updated to access different functionality. For example, in one example context, a connection channel change indicates that a particular user has changed to a computing device that does not have particular device capabilities required or preferred for performing a processing action required in a current set of processing actions in a defined order.

In some embodiments, in response the electronic data management system 102 updates the connection channel(s) for other user data object(s) to grant access to functionality for subsequent processing actions in the defined order, such that the user device's lack of particular device capabilities does not impede the processing of the shared electronic data object. In this regard, the electronic data management system 102 manages the connection channel(s) for user data objects similarly associated with a particular shared electronic data object in a manner that allows for a particular processing action to be temporarily skipped and other processing actions to occur out of turn. In some such embodiments, the electronic data management system 102 retains the results of the subsequently performed processing actions in a circumstance where the skipped processing action is completed, further in some embodiments within particular defined parameters (e.g., within a particular time limit, and/or the like). In some such embodiments still, in a circumstance where the skipped processing action is not completed within the defined parameters, the processing actions performed out of turn are rolled back such that they may be performed again via the electronic data management system 102. In yet other embodiments, in response to a connection channel change associated with a particular user data object corresponding to a shared electronic data object, the electronic data management system 102 updates the connection channel(s) for other user data object(s) to provide access to functionality associated with device capabilities that may be performed by each computing device for each user data object corresponding to the shared electronic data object. In this regard and as described herein, it should be appreciated that some embodiments maintain connection channel(s) in a manner such that connection channel(s) associated with maintaining a particular shared electronic data object are updated for improved efficiency in processing the shared electronic data object and/or for utilizing appropriate functionality.

Example Apparatuses of the Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the electronic data object management system 102 is embodied by one or more computing systems, such as the apparatus 200 as shown in FIG. 2. The apparatus 200 may include a processor, memory 204, input/output circuitry 206, communications circuitry 208, electronic data management circuitry 210, and/or channel connection management circuitry 210. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" may include processing circuitry, storage media, network interfaces, input/output devices, and the like. In some embodiments, other elements of the apparatus 200 may provide or supplement the functionality of the particular circuitry. For example, the processor 202 may provide processing functionality, the memory 204 may provide storage functionality, the communications circuitry 208 may provide network interface functionality, and the like, to one or more of the other sets of circuitry.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure. In some embodiments, for example, the memory 204 embodies one or more databases for storing user data objects, electronic data objects, and/or other data associated therewith, and/or otherwise is configured to maintain such data objects for accessing and/or updating as described herein.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 is configured to provide functionality associated with accessing and/or processing electronic data object(s) maintained by the apparatus 200. In some such embodiments, such functionality includes generating new electronic data object(s), storing electronic data object(s), updating electronic data object(s), updating action status values(s) associated with processing action(s) to be performed for one or more electronic data object(s), performing processing actions associated with one or more electronic data object(s), and/or the like. Additionally or alternatively, in some embodiments, the processor 202 is configured to provide functionality associated with maintaining one or more channel connection(s). In some such embodiments, such functionality includes authenticating a user, initiating a new connection channel, associating a connection channel with a user data object, detecting connection channel change(s), and/or updating one or more connection channel(s). In some such embodiments, the processor 202 is configured for performing one or more of the operations of the computer-implemented processes described herein.

In some embodiments, the apparatus 200 may include input/output circuitry 206 that may, in turn, be in communication with processor 202 to provide output to the user and, in some embodiments, to receive an indication of a user input. The input/output circuitry 206 may comprise one or more user interfaces, and may include a display to which user interface(s) may be rendered. In some embodiments, the input/output circuitry 206 may comprise a web user interface, a mobile application, a desktop application, a linked or networked client device, and/or the like. In some embodiments, the input/output circuitry 206 may also include a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the apparatus 200. The processor and/or user interface circuitry comprising the processor, for example processor 202, may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, at least a network interface for enabling communications with a wired or wireless communications network. For example, the communications circuitry 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The electronic data management circuitry 210 includes hardware, software, firmware, and/or a combination thereof, configured to support electronic data object management functionality associated with the electronic data management system 102. The electronic data management circuitry 210 may utilize processing circuitry, such as the processor 202, to perform one or more of these actions. In some embodiments, the electronic data management circuitry 210 includes hardware, software, firmware, and/or a combination thereof, to generate and/or store new electronic data object(s). Additionally or alternatively, in some embodiments, the electronic data management circuitry 210 includes hardware, software, firmware, and/or a combination thereof, to perform one or more processing actions associated with an electronic data object. Non-limiting examples of a processing action include performing an electronic authorization action(s) associated with one or more user data object(s). Additionally or alternatively, in some embodiments, the electronic data management circuitry 210 includes hardware, software, firmware, and/or a combination thereof, to identify specific functionality accessible by one or more connection channel(s) for particular user data object(s), and/or provide access to such specific functionality. Additionally or alternatively, in some embodiments, the electronic data management circuitry 210 includes hardware, software, firmware, and/or a combination thereof, to maintain and/or update one or more database(s) including user data object(s), electronic data object(s), and/or the like in response to user interaction via one or more connection channel(s). It should be appreciated that, in some embodiments, the electronic data management circuitry 210 may include a separate processor, specially configured field programmable gate array (FPGA), or a specially configured application-specific integrated circuit (ASIC).

The channel connection management circuitry 212 includes hardware, software, firmware, and/or a combination thereof, configured to support connection channel management functionality associated with the electronic data management system 102. In some embodiments, the channel connection management circuitry 210 may utilize processing circuitry, such as the processor 202, to perform one or more of these actions. In some embodiments, the channel connection management circuitry 212 includes hardware, software, firmware, and/or a combination thereof, to establish a connection channel associated with a particular user data object and/or computing device. Additionally or alternatively, in some embodiments, the channel connection management circuitry 212 includes hardware, software, firmware, and/or a combination thereof, to detect connection channel change(s) associated with a particular user data object. Additionally or alternatively, in some embodiments, the channel connection management circuitry 212 includes hardware, software, firmware, and/or a combination thereof, to update one or more connection channel(s). For example, in some embodiments, the channel connection management circuitry 212 includes hardware, software, firmware, and/or a combination thereof, to update one or more connection channel(s) in response to a detected connection channel change. It should be appreciated that, in some embodiments, the channel connection management circuitry 212 may include a separate processor, specially configured field programmable gate array (FPGA), or a specially configured application-specific integrated circuit (ASIC).

In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, the electronic data management circuitry 210 and the channel connection management circuitry 212 may be embodied by a single set of circuitry, and/or one or more of the electronic data management circuitry 210 and/or the channel connection management circuitry 212 may be combined with the processor 202. Additionally or alternatively, in some embodiments, one or more of the sets of circuitry described herein may be configured to perform one or more of the actions described with respect to one or more of the other sets of circuitry.

In at least one example embodiment, a user computing device, such as one of the user computing devices 104 is embodied by one or more computing systems, such as the apparatus 300 as shown in FIG. 3. The apparatus 300 may include a processor 302, memory 304, input/output circuitry 306, communications circuitry 308, specialized device capabilities circuitry 310, and/or the user management circuitry 312. Each of the similarly named components 302-308, in some embodiments, function in a manner similar to that described herein with respect to the similarly named components in FIG. 2.

The specialized device capabilities circuitry 310 includes hardware, software, firmware, and/or a combination thereof, configured to support identifying and/or performing one or more device capabilities of a user computing device, such as one of the user computing devices 104. In this regard, in some embodiments the specialized device capabilities circuitry 310 includes hardware, software, firmware, and/or a combination thereof, to perform specific functionality including image capture and/or processing, specific user input methodologies (e.g., user drawing and/or handwriting), audio capture and/or processing, and/or the like. In some such embodiments, one or more device capabilities is provided at least in part by specific hardware that enables input of specific data, for example a microphone for capturing audio input data and/or a camera for capturing image and/or video input data. Other non-limiting examples include a touch-based interface that enables hand-written user input (e.g., a user's signature). Additionally or alternatively, in some embodiments, the specialized device capabilities circuitry 310 includes particular software (e.g., executable code instructions and/or applications) that enable such device capabilities. For example, in some embodiments, a particular application program is utilized for receiving user input (e.g., audio, video, image, handwriting, or other input), and/or processing such input. In yet other embodiments still, the specialized device capabilities circuitry 310 includes particular application(s) installed to and/or otherwise executable by the apparatus 300, and which may not be executable by other computing devices. Additionally or alternatively still, in yet some other embodiments, the specialized device capabilities circuitry 310 includes hardware, software, firmware, and/or a combination thereof, to determine a list of device capabilities performable by the apparatus 300, and/or determine whether a particular device capability is performable by the apparatus 300. It should be appreciated that, in some embodiments, the specialized device capabilities circuitry 310 may include a separate processor, specially configured field programmable gate array (FPGA), or a specially configured application-specific integrated circuit (ASIC).

The user management circuitry 312 includes hardware, software, firmware, and/or a combination thereof, configured to support functionality for interaction with an electronic data management system, such as the electronic data management system 102, by a user computing device, such as one of the user computing devices 104. In this regard, in some embodiments the specialized device capabilities circuitry 310 includes hardware, software, firmware, and/or a combination thereof, to establish a connection channel with the electronic data management system to access functionality provided by the electronic data management system. Additionally or alternatively, in some embodiments, the user management circuitry 312 includes software, hardware, firmware, and/or a combination thereof, to execute an application (e.g., a web-based or native application) provided by the electronic data management system for accessing such functionality. Additionally or alternatively, in some embodiments, the user management circuitry 312 includes software, hardware, firmware, and/or a combination thereof to enable a channel connection change from a first connection channel to a second connection channel associated with the apparatus 300. For example, in some embodiments, the user management circuitry 312 includes hardware, software, firmware, and/or the like to establish a connection channel with an electronic data management system associated with processing a shared electronic data object and/or a particular user data object. Additionally or alternatively, in some embodiments, the user management circuitry 312 includes hardware software, firmware, and/or the like, to receive an indication of a connection channel change and/or user input data and/or changes to device configurations associated therewith. Alternatively or additionally still, in some embodiments, the user management circuitry 312 includes hardware, software, firmware, and/or a combination thereof, to initiate a connection channel change on a single computing device, and/or initiate a connection channel change from a first computing device to a second computing device. Additionally or alternatively still, in some embodiments, the user management circuitry 312 includes hardware, software, firmware, and/or a combination thereof, to cause rendering of one or more user interface(s) comprising various interface element(s) providing access to functionality via the electronic data management system, and/or updating one or more user interfaces to include updated interface element(s) to provide access to updated functionality via the electronic data management system, alert(s) indicating various determinations and/or statuses of access to functionality and/or the connection channel, and/or the like. It should be appreciated that, in some embodiments, the user management circuitry 312 may include a separate processor, specially configured field programmable gate array (FPGA), or a specially configured application-specific integrated circuit (ASIC).

In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, the specialized device capabilities circuitry 310 and the user management circuitry 312 may be embodied by a single set of circuitry, and/or one or more of the specialized device capabilities circuitry 310 and/or the user management circuitry 312 may be combined with the processor 302. Additionally or alternatively, in some embodiments, one or more of the sets of circuitry described herein may be configured to perform one or more of the actions described with respect to one or more of the other sets of circuitry.

Example Data Flow of the Disclosure

FIG. 4 illustrates a data flow diagram depicting operations of an example system in accordance with at least one example embodiment of the present disclosure. Specifically, FIG. 4 depicts operations of an example data flow 400 for multi-user connection channel management including various operations performed by an electronic data management system 452 in communication with various user computing devices. Such computing devices include a first computing device 454A and a second computing device 454B both associated with a user data object representing User A. Such computing devices further include a computing device 456 associated with a user data object representing User B. Such computing devices further include a computing device 458 associated with a user data object representing User C. In some embodiments, the electronic data management system 452 is embodied by one or more devices, such as the apparatus 200 that utilizes one or more of the components 202-212 for performing each of the operations described herein with respect to the electronic data management system 452. Similarly, in some embodiments, each of the computing devices 454A, 454B, 456 and 458 is embodied by one or more devices, such as the apparatus 300 that utilizes one or more of the components 302-312 for performing each of the operations described herein with respect to the respective user computing devices 454A, 454B, 456, and/or 458.

It should be appreciated that, while the operations are depicted and described in a particular order, the operations as depicted and described may be performed in any of a number of orders in the manner described. In this regard, one or more operations depicted and described after a second operation may be performed before the second operation in another embodiment. In this regard, the particular order of the operations depicted and described should be understood not to limit the scope and spirit of this disclosure. Additionally or alternatively, in some embodiments, one or more operations may not be performed, and/or may be performed in sub-operations as described herein. For example and without limitation, one or more optional operations are depicted utilizing dashed (or "broken") lines herein. It should be appreciated that, in some embodiments, one or more optional operations are performed, whereas in other embodiments, no optional operations are performed. In some embodiments, all optional operations as depicted and described are performed.

At operation 402, the User A computing device 454A establishes a connection channel with the electronic data management system 452. In some embodiments, the User A computing device 454A establishes the connection channel through transmitting a specially configured request and/or particular information to the electronic data management system 452. In some embodiments, the User A computing device 454A provides a natural person identifier, device identifier, and/or other unique identifier that may be utilized for identifying a corresponding user data object. In other embodiments, the User A computing device 454A provides user authentication credentials and/or other data utilized for performing one or more authentication process(es). Additionally or alternatively, in some embodiments, the electronic data management system 452 processes the received information and/or utilizes the received information for establishing the connection channel. For example, in one or more embodiments, the electronic data management system 452 identifies a user data object to associate with a connection channel being newly established, such as based on received information identifying the computing device 454A and/or the associated user.

In some embodiments, establishing the connection channel includes authenticating the user of the computing device 454A. In some such embodiments, the User A provides user authentication credentials via the computing device 454A, which the electronic data management system 452 receives for processing. In some embodiments, the electronic data management system 452 processes the received user authentication credentials to identify a corresponding user data object provisioned for accessing the electronic data management system 452. If such a user data object is identified, the electronic data management system 452 may proceed with establishing the connection channel with the computing device 454A. In other contexts, where the electronic data management system 452 cannot successfully authenticate the user authentication credentials, the electronic data management system 452 may reject the connection and/or otherwise indicate to the computing device 454A that a connection channel has not been established, and/or to try different user authentication credentials and/or a different authentication methodology. Once a connection channel is established, the computing device 454A may communicate with the electronic data management system 452 via the connection channel to access functionality accessible to the identified user data object and provided by the electronic data management system 452. For example, as described herein, User A may utilize the computing device 454A and established connection channel to utilize functionality associated with accessing electronic data object(s), performing processing action(s), and/or otherwise managing electronic data object(s) as described herein.

At optional operation 404, the computing device 454A requests to create an electronic data object and/or to access an electronic data object maintained by the electronic data management system 452. In some embodiments, for example, at optional operation 404 the computing device 454A transmits a request to create a new electronic data object. It should be appreciated that, as described herein, the computing device 454A transmits one or more requests to the electronic data management system 452 via the established connection channel for creating the electronic data object. In some embodiments, the electronic data management system provides one or more user interfaces to enable a user to submit the request to create a new electronic data object, and/or information to be included in or otherwise associated with the newly created electronic data object.

In some such embodiments, the electronic data management system 452 creates the electronic data object at operation 406. In some such embodiments, the electronic data management system 452 generates the new electronic data object and stores it. For example, in some embodiments, the electronic data management system 452 automatically stores the electronic data object associated the electronic data object with the user data object for the established connection channel. In this regard, the user data object may be utilized to retrieve the user data object at a later time. In some embodiments, such as where the electronic data object created embodies a shared electronic data object, the user may similarly associate the electronic data object with one or more other user data objects, such as those user data objects representing users that are to perform one or more processing actions associated with the electronic data object.

In other embodiments, at operation 406, the computing device 454A requests, via the established connection channel, to access an existing electronic data object. In some such embodiments, the electronic data management system 452 may identify a set of electronic data objects corresponding to a particular user data object, such as the user data object for the established connection channel. In some embodiments, the electronic data management system 452 queries one or more databases to retrieve existing electronic data object(s) associated with a particular user data object. In some such embodiments, the identified electronic data objects includes those created by and/or otherwise associated with (e.g., in an instance where the electronic data object is a shared electronic data object created or otherwise originated by another user) the user data object for the established connection channel.

At optional operation 408, the electronic data management system 452 provide the computing device 454A access to functionality for managing the created and/or retrieved electronic data objects. For example, in some embodiments, the electronic data management system 452 provides response information including the retrieved and/or created electronic data objects for rendering via the computing device 454A. In some such embodiments, the computing device 454A renders at least a portion of the electronic data object(s) via the user interface(s) and/or user interface elements configured for managing one or more of such electronic data object(s). It should be appreciated that in some embodiments, the user interface(s) are rendered via a native application executing on the computing device 454A and/or a web application accessed via the computing device 454A (e.g., via a browser application executed on the computing device 454A). For example, in some embodiments, one or more of the electronic data object(s) is/are rendered together with corresponding functionality for performing one or more processing action associated with the electronic data object. Additionally or alternatively, in some embodiments, the electronic data object is rendered together with one or more interface elements for reviewing a portion of the electronic data object, submitting electronic documents required for further processing the electronic data object, and/or otherwise updating the electronic data object via the electronic data management system 452. Additionally or alternatively, in some embodiments, the electronic data object is rendered together with one or more interface elements for associating the electronic data object with one or more other user data objects as a shared electronic data object. In some embodiments, the electronic data management system 452 provides access to specific functionality based on one or more device capabilities performable by the user A computing device 454A, one or more device capabilities determined as incapable of performance by the user A computing device 454A, and/or other detected aspects associated with the user A computing device 454A (e.g., a level of electronic security, computing power, network connectivity, and/or other aspects associated with the performance of the user A computing device 454A). For example, in some example circumstances, the electronic management system 452 provides access to functionality for inputting image and/or video data utilizing camera capabilities when such device capabilities are detected as performable by the user A computing device 454A, and access to alternative input methods (e.g., file uploading) is provided upon detection that the user A computing device 454A is incapable of such camera capabilities. In some other embodiments, in a circumstance where the electronic data management system 452 determines that the network connectivity, computing power, and/or level of electronic security is insufficient for access to particular functionality (e.g., functionality requiring a high level of security), the electronic management system 452 may not provide access to such functionality, and/or provide information to the user indicating they must make changes to their computing device and/or connection channel to access such functionality.

Utilizing the functionality accessible to the user, the user may continue to interact with the computing device 454A to perform various additional operations (not depicted), such as initiating functionality provided by the electronic data management system 402 to update the electronic data object and/or otherwise perform processing actions associated with the electronic data object. In some embodiments, and in the context of a shared electronic data object for example, the user may perform one or more processing actions for a current stage of processing the shared electronic data object. It should be appreciated that, in some embodiments as described herein, the current stage of processing for the shared electronic data object and/or the action status for action process(es) to be performed by one or more other users affects the available functionality to a particular user. For example, in a circumstance where the processing actions are associated with a defined order, the User A may not have access to particular functionality until a certain stage of processing is reached, and/or may receive updated access to such functionality in response to one or more detected connection channel changes as described herein.

At operation 410, the user B computing device 456 establishes a connection channel with the electronic data management system 452. It should be appreciated that, in some embodiments, the user B computing device 456 establishes the connection channel in a similar manner to that described herein with respect to operation 402. For example, in some embodiments, the user B computing device 456 transmits a specially configured request and/or particular information to the electronic data management system 452 to establish the connection. channel. In some embodiments, the user B computing device 456 provides a second natural person identifier associated with User B, a device identifier associated with the user B computing device 456, and/or another unique identifier that may be utilized for identifying a corresponding user data object. In other embodiments, the user B computing device 456 provides user authentication credentials and/or other data, for example stored by the user B computing device 456 or received via user interaction with the device, utilized for performing one or more authentication process(es). In some such embodiments, the electronic data management system 452 identifies another user data object to associate with a second connection channel newly being established, and associates the user data object with the second connection channel newly established. It should be appreciated that in some embodiments, in a manner similar to that described herein with respect to operation 402, the electronic data management system 452 performs one or more authentication process(es) to identify a user data object and/or determine whether a connection channel may be successfully established.

In some embodiments, various users utilize their individual connection channel(s) to access functionality associated with a particular shared electronic data object for user data objects representing each of such users. For example, User A may access first functionality associated with a particular shared electronic data object, and User B may access second functionality associated with the same shared electronic data object. In some such embodiments, the electronic data management system 452 links and/or otherwise associates the connection channels associated with the shared electronic data object and/or user data object(s) associated with the shared electronic data object. In this regard, the electronic data management system 452 maintains the associated connection channel(s) and/or user data object(s) such that detected connection channel change(s) associated with one or more user data object(s) are usable to update one or more associated communication channel and/or another connection channel(s) for an associated user data object.

It should be appreciated that any number of connection channels may be initiated associated with any number of user data object(s). Similarly, any number of connection channels may be linked, for example as associated with a particular shared electronic data object. In this regard, as illustrated, at operation 412, the user C computing device 458 establishes a connection channel with the electronic data management system 452. It should be appreciated that, in some embodiments, the user C computing device 458 establishes the connection channel in a similar manner to that described herein with respect to operation 402 and operation 410. For example, in some embodiments, the user C computing device 458 transmits a specially configured request and/or particular information to the electronic data management system 452 to establish the new connection channel. In some embodiments, the user C computing device 458 provides a third natural person identifier associated with User C, a device identifier associated with the user C computing device 458, and/or another unique identifier that may be utilized for identifying a corresponding user data object. In other embodiments, the user C computing device 458 provides user authentication credentials and/or other data, for example stored by the user C computing device 458 or received via user interaction with the device, utilized for performing one or more authentication process(es). In some such embodiments, the electronic data management system 452 identifies another user data object to associate with a second connection channel newly being established, and associates the user data object with the second connection channel newly established. It should be appreciated that in some embodiments, in a manner similar to that described herein with respect to operation 402 and/or operation 410, the electronic data management system 452 performs one or more authentication process(es) to identify a user data object and/or determine whether a connection channel may be successfully established.

As described herein, one or more user data object(s) are associated with a connection channel change that results in updates to one or more associated connection channel(s). Such connection channel change(s) may result from any of a myriad of actions. In some embodiments, for example, a connection channel change is detected by the electronic data management system 402 in response to disconnection from, or other termination of, a particular connection channel. Additionally or alternatively, in some embodiments, a connection channel change is detected by the electronic data management system 452 in response to establishing a new connection channel via the same computing device (for example, as described with respect to optional operation 414). Additionally or alternatively, in some embodiments, a connection channel change is detected by the electronic data management system 452 in response to establishing a new connection channel via another computing device associated with the same user data object. In other embodiments, an electronic data management system 452 detects a connection channel change in response to any other change to a connection channel, termination of a connection channel, and/or newly established connection channel associated with a user data object.

At optional operation 414, the user A computing device 454A establishes a new connection channel on the same user A computing device 454A. In some embodiments, upon establishing the new connection channel with the user A computing device 454A, the electronic data management system 452 disconnects the previously established connection channel (e.g., established at operation 402), such that the previously established connection channel can no longer be used to access functionality provided by the electronic management system 452. In some embodiments, the new connection channel is requested in response to a change in communication mechanism and/or communication network by the user A computing device 454A. For example, in some embodiments, the connection channel change results in response to activation of cellular networking services on the user A computing device 454A and/or disconnection from a Wi-Fi connection utilized to establish the previous connection channel at operation 402. In other embodiments, the connection channel change results in response to changing from a wired network connection on the user A computing device 454A to a wireless network connection. It should be appreciated that, as described herein, any of a myriad of hardware-driven, software-drive, and/or firmware-driven actions may result in a connection channel change. In this regard, in some such embodiments, the electronic data management system 452 detects a connection channel change by determining that a user data object is attempting to establish a new connection channel when an existing connection channel is already maintained and/or was recently (e.g., within a determinable time interval) maintained by the electronic data management system 452. In some such embodiments, the electronic data management system 452 initiates one or more processes for updating one or more other connection channel(s), for example as described herein with respect to operations 420 and/or 422.

Additionally or alternatively, in some embodiments, the electronic data management system 452 detects a connection channel change in response to a change in user computing device utilized to establish a connection channel for a particular user data object. In this regard, at optional operation 416, the user A computing device 454B establishes a connection channel with the electronic data management system 452. It should be appreciated that, in some embodiments, the user A computing device 454B establishes the connection channel in a similar manner to that described herein with respect to operation 402, operation 410, and/or operation 412. For example, in some embodiments, the user A computing device 454B transmits a specially configured request and/or particular information to the electronic data management system 452 to establish the connection channel. In some embodiments, the user A computing device 454A provides the same natural person identifier associated with User A, a device identifier associated with the user A computing device 454A, and/or another unique identifier that may be utilized for identifying a corresponding user data object. In establishing the connection channel with the user A computing device 454B, the electronic data management system 452 detects that User A has changed from the user A computing device 454A to the user A computing device 454B. Additionally or alternatively, in some embodiments, the electronic data management system 452 determines pertinent information about the computing device with which the new connection channel is being established. For example, based on information received from the user A computing device 454B, previously stored associated with the user data object representing User A and/or the user A computing device 454B, and/or the like, the electronic data management system 452 may determine one or more device capabilities (or lack of device capabilities) associated with the user A computing device 454B. In other embodiments, the electronic data management system 452 determines a level of electronic security, computing power, network connectivity, and/or other aspects associated with the performance of the user A computing device 454B and/or connection channel between the electronic data management system 452 and the user computing device 454B. In some embodiments, the electronic data management system 452 performs one or more of such determinations based on information received from the user A computing device 454B together with or supplemental to the request to establish the connection channel (e.g., metadata associated with the communication network with which the user A computing device 454B is connected, and/or the like).

At operation 418, the electronic data management system 452 provides the user A computing device 454B access to particular functionality for managing electronic data object(s) associated with the user data object with which the connection channel was established. In some embodiments, the electronic data management system 452 retrieves accessible electronic data objects in a manner similar to that described herein with respect to operation 406 herein. In this regard, in some embodiments, the electronic data management system 452 provides access to functionality associated with managing the shared electronic data object associated with the user data objects for User A, User B, and User C and similarly accessible via the connection channel associated with user B computing device 456 and connection channel associated with the user C computing device 458. In some embodiments, the electronic data management system 452 provides access to updated functionality as compared to that accessible via the user A computing device 454A. For example, in some embodiments, the electronic management system 452 provides the user A computing device 454B access to functionality that enables use of the device capabilities performable via the user A computing device 454B. In this regard, it should be appreciated that the connection channel associated with the user A computing device 454B may access updated functionality from that associated with the user A computing device 454A, such that the various device capabilities of each computing device are utilized in providing access to particular functionality.

In response to detecting one or more connection changes, for example on a single computing device as described herein with respect to operation 414 and/or from a first computing device to a second computing device as described with respect to operations 416 and 418, in some embodiments the electronic data management system 452 initiates updating the functionality associated with the shared electronic data object for at least one or more additional connection channel(s). At operation 420, for example, the electronic data management system 452 updates the connection channel associated with the user B computing device 456 based on the detected connection change, such as those described herein with respect to operations 414 and 416, such as to update the functionality accessible by the user B computing device 456. In some embodiments, for example, the electronic data management system 452 updates the connection channel associated with the user computing device 456 to enable access to functionality based on the connection channel change. For example, in a circumstance where the detected connection channel change indicates the user computing device associated with User A is insufficiently secured and/or otherwise cannot perform functionality associated with a current step in a set of processing actions of a defined order, the connection channel may be updated such that functionality for performing subsequent processing actions is available out of turn. Alternatively or additionally, in a circumstance where the detected channel change indicates that User A has changed to a second computing device that is capable of performing a first set of device capabilities and/or is incapable of performing a second set of device capabilities, the connection channel is updated to provide access to functionality that utilizes the first set of device capabilities. In this regard, in some such embodiments, the connection channel is updated to ensure that one or more processing actions are performed utilizing the same one or more device capabilities, a predetermined set of device capabilities, and/or device capabilities available via the computing device(s) associated with each user data object.

It should be appreciated that, as described herein, any number of connection channels associated with any number of user data objects may be updated in response to detecting a connection channel change. For example, as illustrated at operation 422, the electronic data management system 452 updates the connection channel associated with the user C computing device 458 based on the detected connection change, such as those described herein with respect to operations 414 and 416, such as to update the functionality accessible by the user C computing device 458. In some embodiments, the electronic data management system 452 updates the connection channel for the user C computing device 458 in the same manner as the connection channel associated with the user B computing device 456 as described herein with respect to operation 420. Alternatively or additionally, in some embodiments, the electronic data management system 452 updates the functionality accessible via the communication channel associated with the user C computing device 458 to a separate set of functionality. For example, in an example context where a next step and/or stage in a set of processing actions in a defined order is to be performed by the user data object associated with User C and no action is required by the user data object associated with User B, the electronic data management system 452 in some embodiments grants the connection channel for the user C computing device 458 access to functionality for performing the next step when the connection channel change indicates a user (e.g., User A) cannot utilize their current connection channel for completing a current processing action, step, and/or stage. In some such contexts, such functionality is not made accessible to the user B computing device 456 as User B is not required to perform such functionality.

In this regard, the depicted and described data flow enables improved multi-user connection channel management in any of a myriad of ways. Some such embodiments provide such improvements by associating connection channels and/or user data objects associated with a particular shared electronic data object such that connection channel changes detected for a particular connection channel and/or user data object may be utilized to update the connection channel and/or available functionality for another user data object. For example, in some embodiments, as connection channel change(s) occur, one or more embodiments update other connection channel(s) to ensure that accessible functionality enables use of the same device capability and/or particular device capabilities performable by each computing device. Alternatively or additionally, some such embodiments improve efficiency associated with processing an electronic data object, such as by altering one or more other connection channel(s) to enable access to functionality utilized for subsequent processing action(s) to occur out of turn. Such improvements in efficiency and user experience are conventionally not provided due to the independent nature of connection channel(s) in conventional contexts.

Example Electronic Data Object Management System Processes of the Disclosure

Having described example systems, apparatuses, and data flows associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. In regards to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 5 illustrates a flowchart including operations of an example process for connection channel management in accordance with at least one example embodiment of the present disclosure. Specifically, FIG. 5 depicts an example process 500 for improved multi-user connection channel management. In some embodiments, the computer-implemented process 500 is embodied by computer program code stored on a non-transitory computer-readable medium of a computer program product configured for execution to perform the computer-implemented method. Alternatively or additionally, in some embodiments, the example process 500 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 500. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 500 begins at operation 502. At operation 502, the apparatus 200 includes means, such as the input/output circuitry 206, communications circuitry 208, electronic data management circuitry 210, channel connection management circuitry 212, processor 202, and/or the like, to establish a plurality of connection channels associated with a plurality of user data objects. In some such embodiments, each connection channel enables access to functionality associated with a shared electronic data object via one of a plurality of computing devices. For example, in some embodiments, each user data object is associated with a connection channel that links a corresponding user computing device with the apparatus 200.

In some embodiments, the apparatus 200 establishes a connection channel with each computing device in response to one or more transmissions received from the computing device. For example, in some embodiments, the computing device transmits a request to establish the connection channel to the apparatus 200, which the apparatus 200 processes to establish the connection channel. In some such embodiments, the transmission from the computing device (e.g., a request) includes data to be utilized in identifying a user data object for associating with the newly established connection channel. For example, in some embodiments the request includes a device identifier, natural person identifier, and/or other data associated with a particular user data object. Additionally or alternatively, in some embodiments, the transmission includes user authentication credentials, and the apparatus 200 performs one or more authentication processes to authenticate the user authentication credentials as associated with a user data object and/or identify the user data object corresponding to the user authentication credentials based on the user authentication credentials. Upon authenticating and/or otherwise identifying a user data object associated with a transmission, in some such embodiments the apparatus 200 establishes a new connection channel with the computing device that originated the transmission and associates the newly created connection channel with the user data object.

In some embodiments, a transmission from a computing device to establish a connection channel additionally or alternatively includes data indicating aspects of a computing device originating the transmission. For example, in some embodiments, the transmission includes a device identifier and/or a data value representing a device type that may be utilized by the apparatus 200 to determine aspects of the computing device, such as performable device capabilities, a level of security, computing power, and/or the like. Additionally or alternatively, in some embodiments, the transmission includes metadata and/or other data representing the type of communication network over which the computing device is communicating, which in some embodiments is utilized by the apparatus 200 to determine a corresponding network connectivity associated with the computing device, a value from the computing device representing current network connectivity for the computing device, and/or the like. Alternatively or additionally, in some embodiments, the apparatus 200 determines one or more aspects of the computing device at the time of establishing one or more connection channel or at any time after this establishment by transmitting one or more requests for information to the computing device and/or processing the response data received therefrom. For example, in some embodiments, the apparatus 200 requests information from the computing device regarding installed and/or executing applications and utilizes the response data to determine a level of security associated with the computing device, requests information from the computing device regarding hardware and/or executing computer processes and utilizes the response data to determine computing power associated with the computing device, requests information regarding device capabilities, peripheral status, and/or other specific module statuses and utilizes the response data to determine device capabilities of the computing device, and/or the like.

At operation 504, the apparatus 200 includes means, such as the input/output circuitry 206, communications circuitry 208, electronic data management circuitry 210, channel connection management circuitry 212, processor 202, and/or the like, to detect, for a first user data object of the plurality of user data objects, a connection channel change associated with a first connection channel corresponding to a first computing device. For example, in one example context, the connection channel change represents a change in the connection channel associated with the first user data object from a first connection channel to a second connection channel. In this regard, in some such embodiments, the apparatus 200 is configured to maintain a single connection channel associated with each user data object, for example to prevent duplicate actions and/or inconsistent updates across one or more connection channels. In some embodiments, for example, the connection channel change is detected in response to one or more user interactions occurring on the first computing device, as described herein. In other embodiments, the connection channel change is detected in response to user interaction with a second computing device associated with the first user data object. Non-limiting examples of connection changes are described herein with respect to FIGS. 6, 9A, and 9B as described herein.

At operation 506, the apparatus 200 includes means, such as the input/output circuitry 206, communications circuitry 208, electronic data management circuitry 210, channel connection management circuitry 212, processor 202, and/or the like, to update the functionality associated with the shared electronic data object for at least one of the plurality of connection channels based on the detected connection channel change. In some embodiments, the apparatus 200 updates the at least one connection channel such that the updated connection channel is enabled to access particular functionality based on the detected connection channel change. For example, in some embodiments, the apparatus 200 updates a connection channel associated with the first user data object such that the accessible functionality is updated to reflect accessible functionality current aspects of the computing device associated with the connection channel, such as by enabling or disabling access to functionality based on the current computing power, network connectivity, and/or level of security associated with a computing device. In this regard, in some such embodiments, in the context where a connection channel change results in increased or decreased available computing power, network connectivity, and/or level of security associated with the computing device corresponding to the connection channel, the available functionality provided to the user via the computing device may be updated accordingly. In one particular context, for example, if a connection channel change indicates a change from a first, more secure communication network (e.g., the user's password protected home Wi-Fi network) to a second communication network (e.g., a public Wi-Fi network), the accessible functionality may be updated to remove access to functionality requiring high levels of device security. Additionally or alternatively in some embodiments, the apparatus 200 updates a connection channel associated with the first user data object such that the accessible functionality is based on the device capabilities for a newly connected computing device. Alternatively or additionally still, in some embodiments, the apparatus 200 updates functionality for a connection channel associated with a second user data object and/or another user data object, for example in a circumstance where the connection channel change indicates the associated user data object cannot (or is not enabled to) access functionality for completing a current processing action such that the newly enabled functionality allows another user to perform one or more other processing actions out of turn in a set of processing actions associated with a defined order. Non-limiting examples of updating the functionality associated with the shared electronic data object for at least one of the plurality of connection channels based on the detected connection channel change are described herein with respect to FIGS. 6, 7, and/or 8.

FIG. 6 illustrates a flowchart including additional operations of an example process for connection channel management in accordance with at least one example embodiment of the present disclosure. FIG. 6 depicts an example process 600 for updating the functionality associated with a shared electronic data object for at least one of a plurality of connection channels based on a detected connection channel change. In some embodiments, the computer-implemented process 600 is embodied by computer program code stored on a non-transitory computer-readable medium of a computer program product configured for execution to perform the computer-implemented method. Alternatively or additionally, in some embodiments, the example process 600 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 600. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 600 begins at operation 602. In some embodiments, the process 600 begins after one or more operations of another process, such as the operation 504 of the process 500 as depicted and described. Additionally or alternatively, in some embodiments, upon completion of the process 600 flow proceeds to one or more operations of another process. In other embodiments, the flow ends upon completion of the process 600.

At operation 602, the apparatus 200 includes means, such as the input/output circuitry 206, communications circuitry 208, electronic data management circuitry 210, channel connection management circuitry 212, processor 202, and/or the like, to detect the connection channel change from the first connection channel associated with the first computing device of the first user data object to a second connection channel associated with a second computing device of the first user data object. In some embodiments, the connection channel change to the second connection channel associated with the second computing device is detected by receiving, from the second computing device, a request to establish the second connection channel associated with the first user data object. In some such embodiments, the apparatus 200 detects the connection channel change in response to determining that such a request, or other transmission, was received while an ongoing first connection channel was established with the first computing device of the first user data object. In other embodiments, the apparatus 200 detects the connection channel change upon successfully authenticating user authentication credentials received from the second computing device and associated with the first data object corresponding to an ongoing first connection channel.

At operation 604, the apparatus 200 includes means, such as the input/output circuitry 206, communications circuitry 208, electronic data management circuitry 210, channel connection management circuitry 212, processor 202, and/or the like, to detect the second computing device is incapable of performing a first device capability. In some embodiments, the apparatus 200 detects device capabilities performable by the second computing device based on information received from the second computing device. For example, in one or more embodiments, the apparatus 200 receives information indicating the device type of the second computing device, and determines the device capabilities of the second computing device based on known device capabilities associated with the device type. In some such embodiments, the apparatus 200 may maintain and/or otherwise have access to stored data that associates one or more device type(s) with corresponding device capabilities for such device type(s). In other embodiments, the apparatus 200 receives information embodying the various device capabilities performable by the second computing device from the second computing device, for example as part of a request to establish the second connection channel and/or in an additional transmission transmitted to the apparatus 200. In yet other embodiments still, the apparatus 200 requests a status associated with one or more device capabilities from the second computing device, for example by transmitting a request for such information and receiving response information indicating whether the second computing device is capable of performing each of the one or more device capabilities. In some such embodiments, the apparatus determines a computing device is incapable of performing the first device capability in a circumstance where the received and/or otherwise determined information associated with the second computing device does not include information indicating the second computing device is capable of performing the first device capability.

In some embodiments, the first device capability is determined with respect to a current level of functioning for one or more aspects of the first computing device. For example, in some embodiments, the first device capability refers to a current level of security associated with the first computing device, a current level of network connectivity associated with the first computing device, a current level of computing power associated with the first computing device, and/or the like. Such aspects of the first computing device may be variable, such that the value of these aspects change as the computing device continues to operate in various states. For example, in at least one example context, as more application programs are executed on the second computing device the current level of computing power available for the second computing device decreases. Similarly, in at least another example context, as the network strength weakens between the second computing device and a network access point facilitating access to a communication network utilized by the second computing device (e.g., due to distance between the second computing device and the network access point), the level of networking connectivity available for the second computing device decreases. Similarly, in at least another example context, as the second computing device connects to certain communication networks (e.g., public networks) as opposed to more secure networks and/or executes processes that are unidentified or otherwise determined to be insecure, the level of device security associated with the second computing device decreases. In some such embodiments, the apparatus 200 receives one or more of the values for aspects of the second computing device as part of or additional to a transmission from the second computing device. In other embodiments, the apparatus 200 requests such values from the second computing device, and/or information associated therewith to derive one or more of such values from the requested information. For example, in some embodiments the apparatus 200 requests metadata and/or information regarding the communication network with which the second computing device is connected and processes such metadata and/or information to determine a current level of networking connectivity and/or current level of device security associated with the second computing device. In some such contexts, the apparatus 200 determines whether a current level of computing power, current level of networking connectivity, and/or current level of device security are each above a corresponding threshold limit to determine the second computing device is capable of performing a first device capability, and in some contexts determines the second computing device is incapable otherwise (e.g., in a circumstance where the current level is below a corresponding threshold).

At optional operation 606, the apparatus 200 includes means, such as the input/output circuitry 206, communications circuitry 208, electronic data management circuitry 210, channel connection management circuitry 212, processor 202, and/or the like, to detect the second computing device is capable of performing a second device capability. In some such embodiments, the apparatus 200 detects the second computing device is capable of performing a second device capability in a similar manner to that described with respect to detecting a first device capability the computing device is incapable of performing. For example, in some embodiments, the apparatus 200 detects the second device capability is within a set of detected device capabilities associated with the second computing device, as described above with respect to operation 604. In an example context where a list of device capabilities is determined for the second computing device, for example, the apparatus 200 in some embodiments detects the second device capability by searching the list to determine present in the list and thus is capable of being performed.

At operation 608, the apparatus 200 includes means, such as the input/output circuitry 206, communications circuitry 208, electronic data management circuitry 210, channel connection management circuitry 212, processor 202, and/or the like, to update the functionality associated with the shared electronic data object for the second connection channel to enable use of a second device capability that the second computing device is capable of performing. In some embodiments, the apparatus 200 provides access to functionality that utilizes the second device capability for completing a particular processing action. In some embodiments, such as where the second device capability the second computing device is capable of performing is determined at operation 606, the apparatus 200 provides access to functionality that utilizes the second device capability. In one example context, for example where the apparatus 200 detects the second computing device is not capable of using a camera module but is capable of file upload, the apparatus 200 enables access to functionality to upload an image file for processing. In other contexts, for example where the apparatus 200 detects the second computing device is capable of image capture (e.g., using a camera module), the apparatus 200 enables access to functionality to capture an image file for processing utilizing the camera module associated with the second computing device.

In some embodiments, such as where the apparatus 200 fails to identify any second device capability that is usable for performing a particular processing action, the apparatus 200 may provide access to functionality that merely informs the user of a preferred or required device capability for performing a particular processing action. For example, as described herein, in some embodiments the apparatus 200 provides an alert informing the user of such preferred and/or necessary device capabilities. Non-limiting examples of such alerts are described herein with respect to FIG. 7.

By updating the functionality associated with the shared electronic data object for the second connection channel to enable use of a second device capability that the second computing device is capable of performing, such embodiments manage connection channels in an improved manner so as to ensure that functionality accessible to a particular computing device utilizes the capabilities of the computing device. In this regard, updating functionality accessible via a connection channel based on usable device capabilities improves the user experience by ensuring consistently usable functionality is accessible. Additionally or alternatively, updating functionality accessible via a connection channel based on usable device capabilities improves overall processing efficiency associated with processing the shared electronic data object by providing access to functionality optimized for utilizing device capabilities actually performable by the second computing device, as opposed to other device capabilities not performable by the second computing device.

FIG. 7 illustrates a flowchart including additional operations of an example process for connection channel management in accordance with at least one example embodiment of the present disclosure. FIG. 7 depicts an example process 700 for updating the functionality associated with a shared electronic data object for at least one of a plurality of connection channels based on a detected connection channel change. In some embodiments, the computer-implemented process 700 is embodied by computer program code stored on a non-transitory computer-readable medium of a computer program product configured for execution to perform the computer-implemented method. Alternatively or additionally, in some embodiments, the example process 700 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 600. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 700 begins at operation 702. In some embodiments, the process 700 begins after one or more operations of another process, such as the operation 504 of the process 500 as depicted and described. Additionally or alternatively, in some embodiments, upon completion of the process 700 flow proceeds to one or more operations of another process. In other embodiments, the flow ends upon completion of the process 700.

At operation 702, the apparatus 200 includes means, such as the input/output circuitry 206, communications circuitry 208, electronic data management circuitry 210, channel connection management circuitry 212, processor 202, and/or the like, to detect the second computing device is incapable of performing a first device capability. For example, in some embodiments, the apparatus 200 detects device capabilities performable by the second computing device based on information received from the second computing device. For example, in one or more embodiments, the apparatus 200 receives information indicating the device type of the second computing device, and determines the device capabilities of the second computing device based on known device capabilities associated with the device type. In some such embodiments, the apparatus 200 may maintain and/or otherwise have access to stored data that associates one or more device type(s) with corresponding device capabilities for such device type(s). In other embodiments, the apparatus 200 receives information embodying the various device capabilities performable by the second computing device from the second computing device, for example as part of a request to establish the second connection channel and/or in an additional transmission transmitted to the apparatus 200. In yet other embodiments still, the apparatus 200 requests a status associated with one or more device capabilities from the second computing device, for example by transmitting a request for such information and receiving response information indicating whether the second computing device is capable of performing each of the one or more device capabilities. In some such embodiments, the apparatus determines a computing device is incapable of performing the first device capability in a circumstance where the received and/or otherwise determined information associated with the second computing device does not include information indicating the second computing device is capable of performing the first device capability.

In some embodiments, the first device capability is determined with respect to a current level of functioning for one or more aspects of the first computing device. For example, in some embodiments, the first device capability refers to a current level of security associated with the first computing device, a current level of network connectivity associated with the first computing device, a current level of computing power associated with the first computing device, and/or the like. Such aspects of the first computing device may be variable, such that the value of these aspects change as the computing device continues to operate in various states. For example, in at least one example context, as more application programs are executed on the second computing device the current level of computing power available for the second computing device decreases. Similarly, in at least another example context, as the network strength weakens between the second computing device and a network access point facilitating access to a communication network utilized by the second computing device (e.g., due to distance between the second computing device and the network access point), the level of networking connectivity available for the second computing device decreases. Similarly, in at least another example context, as the second computing device connects to certain communication networks (e.g., public networks) as opposed to more secure networks and/or executes processes that are unidentified or otherwise determined to be insecure, the level of device security associated with the second computing device decreases. In some such embodiments, the apparatus 200 receives one or more of the values for aspects of the second computing device as part of or additional to a transmission from the second computing device. In other embodiments, the apparatus 200 requests such values from the second computing device, and/or information associated therewith to derive one or more of such values from the requested information. For example, in some embodiments the apparatus 200 requests metadata and/or information regarding the communication network with which the second computing device is connected and processes such metadata and/or information to determine a current level of networking connectivity and/or current level of device security associated with the second computing device. In some such contexts, the apparatus 200 determines whether a current level of computing power, current level of networking connectivity, and/or current level of device security are each above a corresponding threshold limit to determine the second computing device is capable of performing a first device capability, and in some contexts determines the second computing device is incapable otherwise (e.g., in a circumstance where the current level is below a corresponding threshold).

At operation 704, the apparatus 200 includes means, such as the input/output circuitry 206, communications circuitry 208, electronic data management circuitry 210, channel connection management circuitry 212, processor 202, and/or the like, to generate an alert comprising data indicating the first device capability is preferred or required. In this regard, the first device capability may be preferred or required for performing a processing action at the current stage of processing associated with the shared electronic data object. For example, in some embodiments, the device capability is utilized to securely provide information required for further processing the shared electronic data object, submitting an electronic user authorization, and/or the like. Alternatively or additionally, in some embodiments the device capability is indicated as preferred or required for submitting data of a particular type (e.g., captured image data) for a current step of processing action in processing the shared electronic data object. In one example context, the alert indicates that a camera module is required for a current processing action that involves taking a picture of a user identification document for use in validating the identity of the user (e.g., a driver's license, social security card, and/or the like) as part of processing a particular shared electronic data object (e.g., a loan application on behalf of a company). In some embodiments, for example, the apparatus 200 generates the alert as a transmission to the second computing device, where the transmission includes information indicating the first device capability is preferred or required for rendering via one or more user interfaces. In other embodiments, the apparatus 200 generates the interface element indicating the first device capability is preferred or required for rendering to a user interface via the second computing device.

At operation 706, the apparatus 200 includes means, such as the input/output circuitry 206, communications circuitry 208, electronic data management circuitry 210, channel connection management circuitry 212, processor 202, and/or the like, to cause rendering of the alert to display associated with the second computing device. In some embodiments, the apparatus 200 transmits the alert to the second computing device to cause rendering via the display. In some embodiments, the apparatus 200 transmits the alert embodying data utilized to configured a user interface generated by, predetermined by, and/or otherwise configured by the second computing device. In other embodiments, the apparatus 200 transmits the alert embodying one or more interface elements for rendering to the display of the second computing device within a rendered user interface.

In some such embodiments, functionality is not made accessible to the user in a circumstance where the user's computing device is not associated with suitable device capabilities for utilizing the functionality in the desired manner. For example, in this regard, functionality may be inaccessible in an instance where the user computing device's level of security is insufficient to ensure that received data is trustworthy, the computing device's connection with a communication network is not stable, and/or another determination is made such that providing functionality would diminish processing expediency and/or decrease overall data security associated with processing the shared electronic data object. In this regard, by providing the alert as described herein, embodiments maintain such processing expediency without comprising data security in processing the shared electronic data object. The alert further improves the user experience by enabling the user of the second computing device to utilize such information to determine steps that could enable access to such functionality. Such improvements may be provided in combination with the other improvements described herein, with respect to enabling access to functionality in other connection channels for performing one or more processing actions out of turn to further improve the expediency of processing the shared electronic data object.

FIG. 8 illustrates a flowchart including additional operations of an example process for connection channel management in accordance with at least one example embodiment of the present disclosure. Specifically, FIG. 8 depicts an example process 800 for updating the functionality associated with a shared electronic data object for at least one of a plurality of connection channels based on a detected connection channel change. In some embodiments, the computer-implemented process 800 is embodied by computer program code stored on a non-transitory computer-readable medium of a computer program product configured for execution to perform the computer-implemented method. Alternatively or additionally, in some embodiments, the example process 800 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 800. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 800 begins at operation 802. In some embodiments, the process 800 begins after one or more operations of another process, such as the operation 504 of the process 500 as depicted and described. Additionally or alternatively, in some embodiments, upon completion of the process 800 flow proceeds to one or more operations of another process. In other embodiments, the flow ends upon completion of the process 800.

At operation 802, the apparatus 200 includes means, such as the input/output circuitry 206, communications circuitry 208, electronic data management circuitry 210, channel connection management circuitry 212, processor 202, and/or the like, to determine a set of user-driven actions to be performed in a defined order associated with the plurality of user data objects. In some such embodiments, the set of user-driven actions comprises a first user-driven action associated with a first user data object and a second user-driven action associated with a second user data object of a plurality of user data objects. The plurality of user data objects may represent each user data object associated with a particular shared electronic data object, for example. Additionally or alternatively, in some embodiments, the defined order indicates the first user-driven action is to be performed before the second user-driven action. In this regard, the set of user-driven actions may define a particular set of processing actions to be performed to complete processing of the shared electronic data object. In some such embodiments, the set of user-driven actions is defined into a plurality of stages, each stage comprising one or more user-driven actions that are to be performed before beginning user-driven actions of a next stage.

It should be appreciated that, in some embodiments, a shared electronic data object is associated with any number of user-driven actions and/or stages of user-driven actions. In some embodiments, the set of user-driven actions to be performed for processing a particular shared electronic data object, and/or the stages representing a defined order for performing such user-driven actions, is determinable and/or predetermined based on the type of electronic data object. For example, in one example context, an electronic loan application processed by a system of a financial institution is determined to require processing of a first set of user-driven actions, and an account request application processed by a system of a financial institution is determined to require processing of a second set of user-driven actions. In some such embodiments, the set of user-driven actions is organized into a set of stages, such that the order of the stages and user-driven actions at each stage represents the defined order for processing the electronic data object.

At operation 804, the apparatus 200 includes means, such as the input/output circuitry 206, communications circuitry 208, electronic data management circuitry 210, channel connection management circuitry 212, processor 202, and/or the like, to enable access, in response to detecting the connection channel change, to the second user-driven action via a second connection channel associated with a second computing device of the plurality of computing devices before completion of the first user-driven action. For example, in some such embodiments, the apparatus 200 enables access to such functionality where the connection channel change indicates a user is utilizing a computing device that is incapable of performing the device capabilities required for a user-driven action at a current stage, and/or wherein the non-performed user-driven action is preventing progression to another stage of processing the shared electronic data object. In this regard, in some such embodiments, the apparatus 200 updates the functionality accessible by the second connection channel such that the accessible functionality enables performance of a user-driven action at the next stage of processing the shared electronic data object. For example, in an example context where a first stage requires electronic authorization actions associated with User A and User B before proceeding to a second stage requiring an electronic authorization action by User C, and User B has completed the electronic authorization action and a connection channel change was detected with respect to User A indicating the user computing device associated with User A is incapable of performing the electronic authorization action via the established connection channel, the apparatus 200 updates the connection channel associated with User C to enable access to functionality associated with performing the electronic authorization action required at the second stage out of turn (e.g., before the electronic authorization action is performed by User A).

In some embodiments, the apparatus 200 is configured to revert one or more processing actions performed out of turn, as described herein, in response to one or more determinations. For example, in some embodiments, upon performance of a processing action out of turn, the apparatus 200 begins a timer within which the skipped processing action(s) must be completed. Continuing the example context above, in a circumstance where User A's electronic authorization action is skipped and User C performs an electronic authorization out of turn, the apparatus 200 may revert the electronic authorization action of User C in a circumstance where User A does not complete their electronic authorization within 24 hours (or another determinable time interval). In some embodiments, the time interval and/or determinations for reverting one or more processing action(s) are based on a desired level of data security associated with the shared electronic data object, an assigned importance value associated with the shared electronic data object, a type of shared electronic data object, and/or the like.

In this regard, embodiments described herein provide improvements to multi-user connection channel management. For example, such embodiments improve the efficiency and expediency at which the shared electronic data object may be processed. By maintaining connection channel(s) associated with one another, such embodiments enable updating the connection channel(s) to provide necessary functionality for achieving such efficient and/or expedient processing as user(s) change their connection channel(s) utilized to access functionality provided by the apparatus 200.

FIG. 9A illustrates a flowchart including additional operations of an example process for connection channel management in accordance with at least one example embodiment of the present disclosure. Specifically, FIG. 9A depicts an example process 900 for detecting, for a first user data object, a connection channel change associated with a first connection channel. In some embodiments, the computer-implemented process 900 is embodied by computer program code stored on a non-transitory computer-readable medium of a computer program product configured for execution to perform the computer-implemented method. Alternatively or additionally, in some embodiments, the example process 900 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 900. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 900 begins at operation 902. In some embodiments, the process 900 begins after one or more operations of another process, such as the operation 504 of the process 500 as depicted and described. Additionally or alternatively, in some embodiments, upon completion of the process 900 flow proceeds to one or more operations of another process, such as the operation 506 of the process 500 as depicted and described. In other embodiments, the flow ends upon completion of the process 900.

At operation 902, the apparatus 200 includes means, such as the input/output circuitry 206, communications circuitry 208, electronic data management circuitry 210, channel connection management circuitry 212, processor 202, and/or the like, to detect connection via a second connection channel associated with a second computing device of the first user data object and disconnection from the first connection channel by the first computing device of the first user data object. In this regard, in some such embodiments, the connection to a second computing device indicates the user has switched to utilizing the second computing device. In some such embodiments, the apparatus 200 detects the connection via the second connection channel in response to receiving a request to establish the second connection channel associated with the first user data object via the second computing device, and/or an equivalent transmission. Additionally or alternatively, in some embodiments, the apparatus 200 detects the connection via the second connection channel in response to successfully completing a user authentication process as associated with the first user data object for establishing the second connection channel.

In this regard, by detecting the connection channel change from a first computing device to a second computing device, the apparatus 200 may perform one or more operations based on the differences between the devices. For example, the apparatus 200 may identify the differences in device capabilities and update one or more connection channel(s) based on the identified differences, as described herein. In some embodiments, flow then continues to one or more operations of another process, for example the process 1000 as described with respect to FIG. 10.

FIG. 9B illustrates yet another flowchart including additional operations of an example process for connection channel management in accordance with at least one example embodiment of the present disclosure. Specifically, FIG. 9B depicts an example process 950 for detecting, for a first user data object, a connection channel change associated with a first connection channel. In some embodiments, the computer-implemented process 950 is embodied by computer program code stored on a non-transitory computer-readable medium of a computer program product configured for execution to perform the computer-implemented method. Alternatively or additionally, in some embodiments, the example process 950 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 950. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 950 begins at operation 952. In some embodiments, the process 950 begins after one or more operations of another process, such as the operation 504 of the process 500 as depicted and described. Additionally or alternatively, in some embodiments, upon completion of the process 950 flow proceeds to one or more operations of another process, such as the operation 506 of the process 500 as depicted and described. In other embodiments, the flow ends upon completion of the process 950.

At operation 952, the apparatus 200 includes means, such as the input/output circuitry 206, communications circuitry 208, electronic data management circuitry 210, channel connection management circuitry 212, processor 202, and/or the like, to detect connection, via a second connection channel, by the first computing device of the first user data object and disconnection from the first connection channel by the first computing device of the first data object. In some such embodiments, the second connection channel is associated with a second communication network. For example, in some embodiments, the connection channel change results from a user-initiated change in networking mechanism resulting in a second communication network, and/or user-initiated change to a new connection channel. In some such embodiments, the apparatus 200 detects the connection via the second connection channel in response to receiving an updated request, transmission, and/or other notification from the first computing device indicating a change to the second communication network. For example, the apparatus 200 may receive such information as part of a subsequent transmission to the apparatus 200 after the user has connected the first computing device to the second communication network. In some embodiments, the disconnection from the first connection channel is detected automatically based on establishing the second connection channel. In other embodiments, the apparatus 200 detects the disconnection in response to specific information received from the first computing device and/or second computing device (e.g., a transmission requesting disconnection of the first connection channel).

FIG. 10 illustrates a flowchart including additional operations of an example process for connection channel management in accordance with at least one example embodiment of the present disclosure. Specifically, FIG. 10 depicts an example process 1000 for detecting device capabilities, such as for use in updating one or more connection channel(s) based on such device capabilities. In some embodiments, the computer-implemented process 1000 is embodied by computer program code stored on a non-transitory computer-readable medium of a computer program product configured for execution to perform the computer-implemented method. Alternatively or additionally, in some embodiments, the example process 1000 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 900. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

In various embodiments, the process 1000 includes any combination of the operations described with respect to FIG. 10. For example, in some embodiments, only one of the operations 1002-1010 is performed in a particular embodiment. In other embodiments, any combination of the operations 1002-1010 is performed, and/or all operations 1002-1010 are performed.

In some embodiments, the process 1000 begins at operation 1002. In some embodiments, the process 1000 begins after one or more operations of another process, such as the operation 504 of the process 500 as depicted and described. Additionally or alternatively, in some embodiments, upon completion of the process 1000 flow proceeds to one or more operations of another process, such as the operation 506 of the process 500 as depicted and described. In other embodiments, the flow ends upon completion of the process 1000.

At operation 1002, the apparatus 200 includes means, such as the input/output circuitry 206, communications circuitry 208, electronic data management circuitry 210, channel connection management circuitry 212, processor 202, and/or the like, to determine the first computing device is capable of performing a first device capability that the second computing device is incapable of performing. In some such embodiments, the apparatus 200 compares a list of device capabilities performable by the first computing device with a list of device capabilities performable by the second computing device. Additionally or alternatively, in some embodiments, the apparatus 200 compares one specific device capability associated with functionality for a current processing action to be performed associated with the shared electronic data object. In some such embodiments, the determination that the second computing device is incapable of performing the first device capability performable by the first computing device (e.g., associated with a previous connection channel) indicates that one or more updates to one or more connection channel(s) is/are to be initiated. For example, in some embodiments, the determination indicates that one or more connection channel(s) should be updated to make inaccessible certain functionality that utilizes and/or relies on the first device capability. It should be appreciated that the device capabilities for each of the first and second computing devices is determinable in any of the manners described herein.

At operation 1004, the apparatus 200 includes means, such as the input/output circuitry 206, communications circuitry 208, electronic data management circuitry 210, channel connection management circuitry 212, processor 202, and/or the like, to determine the second computing device is capable of performing a second device capability that the first computing device is incapable of performing. In some such embodiments, for example, the apparatus 200 compares a list of device capabilities performable by the first computing device with a list of device capabilities performable by the second computing device. Additionally or alternatively, in some embodiments, the apparatus 200 compares one specific device capability associated with functionality for a current processing action to be performed associated with the shared electronic data object. In some such embodiments, the determination that the second computing device is capable of performing the second device capability not performable by the first computing device (e.g., associated with a previous connection channel) indicates that one or more updates to one or more connection channel(s) is/are to be initiated. For example, in some embodiments, the determination indicates that one or more connection channel(s) should be updated to make accessible certain functionality that utilizes and/or relies on the second device capability, and that may have previously been inaccessible because the first computing device was incapable of performing the device capability. It should be appreciated that the device capabilities for each of the first and second computing devices is determinable in any of the manners described herein.

At operation 1006, the apparatus 200 includes means, such as the input/output circuitry 206, communications circuitry 208, electronic data management circuitry 210, channel connection management circuitry 212, processor 202, and/or the like, to determine the first computing device is associated with a first level of electronic security and the second computing device is associated with a second level of electronic security. In some such embodiments, the first level of electronic security differs from the second level of electronic security. In some such embodiments, for example, the apparatus 200 determines the first level of electronic security is determined based on various factors of the first computing device, and the second level of electronic security is determined based on the same and/or alternative factors of the second computing device. For example, in some embodiments, a level of electronic security for a particular device is associated with hardware of the computing device, software installed and/or executing on the computing device (e.g., whether one or more secure applications are executing on the computing device, whether one or more unidentified and/or untrusted applications is/are executing on the computing device), network mechanisms and/or connected communication networks for the computing device (e.g., whether the computing device is connected to a communication network utilizing wireless mechanisms or wired mechanisms, whether the communication network is public or private, whether the communication network is password or otherwise digitally secured, and/or the like), and/or the like, or any combination of such factors. In this regard, the apparatus 200 may request such information from each of the first computing device and the second computing device.

In some embodiments, the apparatus 200 utilizes the determined level of electronic security for first and/or second computing device, and/or the difference between such determined level of electronic security, in updating one or more connection channel(s). For example, in some embodiments, the apparatus 200 initiates updates to one or more connection channel(s) to access particular functionality requiring a high level of electronic security in a circumstance where the level of electronic security for the second computing device satisfies a particular threshold and the level of electronic security for the first computing device does not satisfy the threshold. In another context where the level of electronic security for the second computing device does not satisfy a corresponding threshold and the level of electronic security for the first computing device did satisfy the threshold, in some embodiments the apparatus 200 initiates updates to one or more connection channel(s) to make inaccessible particular functionality requiring a high level of electronic security. In yet other embodiments, the apparatus determines the second computing device is associated with a level of electronic security that is insufficient to perform a current processing action. In some such embodiments, in response to the determination and in the manner described herein, the apparatus 200 updates one or more connection channel(s) associated with other user data objects for other users to provide access to functionality for performing one or more subsequent processing action(s) out of turn by such users.

At operation 1008, the apparatus 200 includes means, such as the input/output circuitry 206, communications circuitry 208, electronic data management circuitry 210, channel connection management circuitry 212, processor 202, and/or the like, to determine the first computing device is associated with a first computing power and the second computing device is associated with a second level of computing power. In some such embodiments, the first level of computing power differs from the second level of computing power. In some such embodiments, for example, the apparatus 200 determines the first level of computing power based on various factors of the first computing device, and the second level of computing power is determined based on the same and/or alternative factors of the second computing device. For example, in some embodiments, a level of computing power for a particular computing device is based on inherent properties of the hardware of the computing device (e.g., the processor processing speed, memory device(s) storage size, networking interface transfer rate, and/or the like). Additionally or alternatively, in some embodiments, the level of computing power for a particular computing device is based on executing software and/or firmware on the computing device (e.g., the remaining processing power available in view of all currently executing applications, a remaining amount of available network bandwidth, and/or the like). In this regard, the apparatus 200 may request such information from each of the first computing device and the second computing device.

In some embodiments, the apparatus 200 utilizes the determined level of computing power for the first and/or second computing device, and/or the difference between such levels of computing power, in updating one or more connection channel(s). For example, in some embodiments, the apparatus 200 initiates updates to one or more connection channel(s) to access particular functionality requiring a certain level of computing power to perform in a circumstance where the level of computing power for the second computing device satisfies a particular threshold and the level of computing power for the first computing device does not satisfy the threshold. In another context where the level of computing power for the second computing device does not satisfy a corresponding threshold and the level of computing power for the first computing device did satisfy the threshold, in some embodiments the apparatus 200 initiates updates to one or more connection channel(s) to make inaccessible particular functionality requiring the threshold level of computing power. In yet other embodiments, the apparatus determines the second computing device is associated with a level of computing power that is insufficient to perform a current processing action. In some such embodiments, in response to the determination and in the manner described herein, the apparatus 200 updates one or more connection channel(s) associated with other user data objects for other users to provide access to functionality for performing one or more subsequent processing action(s) out of turn by such users.

At operation 1010, the apparatus 200 includes means, such as the input/output circuitry 206, communications circuitry 208, electronic data management circuitry 210, channel connection management circuitry 212, processor 202, and/or the like, to determine the first computing device is associated with a first level of network connectivity and the second computing device is associated with a second level of network connectivity. In some such embodiments, the first level of network connectivity differs for the second level of network connectivity. In some such embodiments, for example, the apparatus 200 determines the first level of network connectivity based on one or more factors of the first computing device, and the second level of network connectivity is determined based on the same and/or alternative factors of the second computing device. For example, in some embodiments, a level of networking connectivity for a particular computing device is based at least on a network bandwidth available to the computing device. Additionally or alternatively, in some embodiments, a level of networking connectivity for a particular computing device is based at least on a signal strength between the computing device and an associate network access point facilitating access to a communication network. For example, in one example context, the network access point is embodied by a router providing access to a Wi-Fi network. In another context, the network access point is embodied by a cell tower communicable with the computing device. It should be appreciated that any of a number of factors, including distance, signal interference, physical interference, and/or any combination of other factors may affect the network connectivity of a particular computing device. In this regard, the apparatus 200 may request such information from each of the first computing device and the second computing device.

In some embodiments, the apparatus 200 utilizes the determined level of network connectivity for the first and/or second computing device, and/or the difference between such levels of network connectivity, in updating one or more connection channel(s). For example, in some embodiments, the apparatus 200 initiates updates to one or more connection channel(s) to access particular functionality requiring a certain level of network connectivity to perform in a circumstance where the level of networking connectivity for the second computing device satisfies a particular threshold and the level of network connectivity for the first computing device does not satisfy the threshold. In another context where the level of network connectivity for the second computing device does not satisfy a corresponding threshold (e.g., indicating a transmission failure is likely, a required file is too large to be transmitted in a determined time interval, and/or the like) and the level of network connectivity for the first computing device did satisfy the corresponding threshold, in some embodiments the apparatus 200 initiates one or more updates to one or more connection channel(s) to make inaccessible particular functionality requiring the threshold level of network connectivity. In yet other embodiments, the apparatus 200 determines the second computing device is associated with a level of network connectivity that is insufficient to perform a current processing action. In some such embodiments, in response to the determination and in the manner described herein, the apparatus 200 updates one or more connection channel(s) associated with other user data objects for other users to provide access to functionality for performing one or more subsequent processing action(s) out of turn by such users.

FIG. 11 illustrates a flowchart including additional operations of an example process for connection channel management in accordance with at least one example embodiment of the present disclosure. Specifically, FIG. 11 depicts an example process 1100 for updating the functionality associated with the shared electronic data object for at least one of a plurality of connection channels based on a detected connection channel change. In some embodiments, the computer-implemented process 1100 is embodied by computer program code stored on a non-transitory computer-readable medium of a computer program product configured for execution to perform the computer-implemented method. Alternatively or additionally, in some embodiments, the example process 1100 may be performed by one or more specially configured computing devices, such as the electronic object management system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1100. In some embodiments, the specially configured apparatus 200 includes and/or otherwise is in communication with one or more external apparatuses, systems, devices, and/or the like, to perform one or more of the operations as depicted and described. For example, the apparatus 200 may include and/or communicate with one or more external user computing devices, for example each embodied by the specially configured apparatus 300.

The process 1100 begins at operation 1102. In some embodiments, the process 1100 begins after one or more operations of another process, such as the operation 504 of the process 500 as depicted and described. Additionally or alternatively, in some embodiments, upon completion of the process 1100 flow proceeds to one or more operations of another process. In other embodiments, the flow ends upon completion of the process 1100.

At operation 1102, the apparatus 200 includes means, such as the input/output circuitry 206, communications circuitry 208, electronic data management circuitry 210, channel connection management circuitry 212, processor 202, and/or the like, to update a second connection channel associated with a second computing device of a plurality of computing devices to access second functionality associated with the shared electronic data object. In some such embodiments, the second connection channel is associated with a second user data object of the plurality of user data objects. For example, in this regard, the apparatus 200 in some such embodiments updates a connection channel associated with another user that differs from the user that underwent the connection channel changes, such that the other user's functionality is updated based on the connection channel change. In some embodiments, for example, the apparatus 200 updates the connection channel for each user data object having access to the shared electronic data object to ensure consistent functionality is accessible by all users. For example, in some embodiments, in a circumstance where the apparatus determines, based on a detected connection channel change that the first user data object is utilizing a computing device that does not have a particular device capability, the apparatus 200 updates each connection channel for all other users associated with the particular shared electronic data object to ensure each user has access to the same functionality that utilizes or otherwise relies on a device capability performable by all computing devices connected via a connection channel. Alternatively or additionally, in some embodiments, in a circumstance where the apparatus 200 determines that functionality should be accessible that enables one or more users to perform a processing action out of turn, the apparatus 200 updates a second connection channel associated with the second computing device to enable the user to perform the processing action out of turn. In an example circumstance, for example, the apparatus 200 provides access to such functionality in a circumstance where the apparatus 200 determines, from the connection channel change, that the first user data object cannot perform a current processing operation for any of a myriad of reasons, such as the user is utilizing a computing device that does not have a sufficient level of computing power, network connectivity, and/or electronic security, the computing device is utilizing an unsecure communication mechanism and/or is connected to an unsecure communication network, and/or the first user computing device is incapable of performing a device capability required for performing the current processing action.

In this regard, in some embodiments, the apparatus 200 maintains connection channel(s) for user data objects associated with a shared electronic data object in a manner that associates such connection channel(s) and/or user data object(s). In some such contexts, the apparatus 200 identifies the associated connection channel(s) and/or user data objects to update appropriate connection channel(s) when one of the user data objects experiences a connection channel change. In this regard, such embodiments provide improvements by enabling multi-user connection channel management not previously utilized in conventional systems. Further, by updating one or more connection channel(s) in response to detected connection channel change(s), embodiments provide improvements by ensuring appropriate functionality is accessible to all users at all times to improve overall efficiency for completing processing of an electronic data object without sacrificing data security, utilizing the methodologies described herein.

Example User Computing Device Processes of the Disclosure

FIG. 12 illustrates a flowchart including operations of an example process for connection channel management in accordance with at least one example embodiment of the present disclosure. Specifically, FIG. 12 depicts an example process 1200 for improved multi-user connection channel management. In some embodiments, the computer-implemented process 1200 is embodied by computer program code stored on a non-transitory computer-readable medium of a computer program product configured for execution to perform the computer-implemented method. Alternatively or additionally, in some embodiments, the example process 1200 may be performed by one or more specially configured computing devices, such as the user computing devices 104 embodied by the specially configured apparatus 300. In this regard, in some such embodiments, the apparatus 300 is specially configured by computer program instructions stored thereon, for example in the memory 304 and/or another component depicted and/or described herein, and/or otherwise accessible to the apparatus 300, for performing the operations as depicted and described with respect to the example process 1200. In some embodiments, the specially configured apparatus 300 includes and/or otherwise is in communication with one or more external apparatuses, systems, devices, and/or the like, to perform one or more of the operations as depicted and described. For example, the apparatus 300 may include and/or communicate with one or more external electronic data management system(s), for example the electronic data management system 102 embodied by the specially configured apparatus 200.

The process 1200 begins at optional operation 1202. At optional operation 1202, the apparatus 300 includes means, such as the input/output circuitry 306, communications circuitry 308, user management circuitry 312, specialized device capabilities circuitry 310, processor 302, and/or the like, to provide, to the electronic data management system, user authentication credentials associated with a first user data object. In some embodiments, the apparatus 300 receives the user authentication credentials in response to user input by a user of the apparatus 300. In other embodiments, the authentication credentials are automatically determined and/or retrieved. For example, in some embodiments, the authentication credentials are stored by the apparatus 300 upon input by a user at an earlier time. In other embodiments, the authentication credentials are automatically determined from the computing device, for example based on one or more hardware identifiers associated with the computing device, software-based identifiers associated with the computing device (e.g., IP and/or other attributed identifiers), and/or the like. As described herein, the electronic data management system in some embodiments receives the user authentication credentials for attempting to authenticate the user authentication credentials and/or identifying a user data object associated therewith.

At operation 1204, the apparatus 300 includes means, such as the input/output circuitry 306, communications circuitry 308, user management circuitry 312, specialized device capabilities circuitry 310, processor 302, and/or the like, to establish, with an electronic data management system, a connection channel associated with processing a shared electronic data object. In some such embodiments, the connection channel is established associated with the first user data object. In some embodiments, as described herein, the connection channel is established associated with the first user data object in response to successful authentication, by the electronic data management system, of user authentication credentials provided to the electronic data management system. In some contexts, the established connection channel enables a secure channel for data transmissions between the apparatus 300 and the electronic data management system. For example, in this regard, the established connection channel enables the user of the apparatus 300 to perform actions via the electronic data management system, and the electronic data management system to associate such actions with the first user data object with reasonable certainty that the user performing the actions is authenticated. In some such embodiments, the apparatus 300 transmits one or more specialized requests to the electronic data management system to initiate establishment of the connection channel. Additionally or alternatively, in some such embodiments, the connection channel is established in conjunction with the electronic data management system in the manner described herein with respect to operations 502.

At operation 1206, the apparatus 300 includes means, such as the input/output circuitry 306, communications circuitry 308, user management circuitry 312, specialized device capabilities circuitry 310, processor 302, and/or the like, to cause rendering of a user interface including one or more interface elements that provide access to first functionality via the electronic data management system. For example, in some embodiments, the first functionality provided is associated with accessing one or more electronic data object(s) associated with the user data object, including the shared electronic data object, and/or performing user-driven actions currently to be performed associated with processing an electronic data object such as the shared electronic data object. It should be appreciated that, in some embodiments, the electronic data management system provides, for example via the established connection channel, one or more data transmissions specially configured to cause the particular one or more interface elements to be rendered. For example, in some embodiments, the electronic data management system determines functionality accessible to the first user data object, and provides specific user interface elements that enables accessing such functionality. In some embodiments, for example, the apparatus 300 renders the user interface as one or more web interfaces including the one or more interface elements. In other embodiments, the apparatus 300 renders the user interface within one or more native applications executed via the apparatus 300.

At operation 1208, the apparatus 300 includes means, such as the input/output circuitry 306, communications circuitry 308, user management circuitry 312, specialized device capabilities circuitry 310, processor 302, and/or the like, to receive an indication of a connection channel change. In some embodiments, the apparatus 300 receives the indication of the connection channel change from the electronic data management system. For example, in some embodiments, the electronic data management system detects a connection channel change associated with the apparatus 300 and/or a computing device of another user data object similarly associated with the shared electronic data object. In other embodiments, the apparatus 300 automatically receives the indication of the connection channel change, for example in response to user input via the apparatus 300 and/or other user interaction with one or more configurations of the apparatus 300. Additionally or alternatively, in some embodiments, the indication is received by the apparatus 300 in response to monitoring certain configurations of the apparatus 300, such as a connected communication network utilized for transmissions over the Internet, available computing power, network connectivity, and/or the like. In some embodiments, the indication of the channel change includes information to be utilized in updating the functionality accessible by the apparatus 300.

At operation 1210, the apparatus 300 includes means, such as the input/output circuitry 306, communications circuitry 308, user management circuitry 312, specialized device capabilities circuitry 310, processor 302, and/or the like, to cause updated rendering, in response to receiving the indication of the connection channel change, of the user interface to comprise one or more second interface elements that provide access to updated functionality via the electronic data management system. In some embodiments, the apparatus 300 removes one or more interface elements from the user interface, renders one or more new interface elements to the user interface, and/or changes a status (e.g., an interactable status) of one or more interface elements of the user interface to enable access to updated functionality. In other embodiments, the apparatus 300 updates the user interface by rendering a new second user interface instead of the user interface, wherein the second user interface comprises the one or more second interface elements to provide access to the updated functionality. In some embodiments, at least one of the one or more second interface element(s) is/are configured to utilize device capabilities of the apparatus 300. Some such device capabilities, in some embodiments, are determined based on the connection channel change and/or identified from and/or otherwise determinable from received the indication. For example, in an example circumstance, the indication indicates another user has changed to a new computing device that is capable of performing a second device capability as opposed to a first device capability, and the one or more second interface elements enables access to functionality that utilizes the second device capability. In other embodiments, for example where a detected connection channel change indicates a user cannot perform a user-driven action of a current step and/or stage of processing the shared electronic data object, the apparatus 300 the one or more second interface elements provides access to functionality for performing, via the apparatus 300, one or more user-driven actions out of turn with respect to a defined order. For example, in some embodiments, the updated functionality enables performing one or more user-driven actions associated with a subsequent stage of processing the shared electronic data object, as described herein.

FIG. 13 illustrates a flowchart including operations of an example process for connection channel management in accordance with at least one example embodiment of the present disclosure. Specifically, FIG. 13 depicts an example process 1300 for improved multi-user connection channel management. In some embodiments, the computer-implemented process 1300 is embodied by computer program code stored on a non-transitory computer-readable medium of a computer program product configured for execution to perform the computer-implemented method. Alternatively or additionally, in some embodiments, the example process 1300 may be performed by one or more specially configured computing devices, such as the user computing devices 104 embodied by the specially configured apparatus 300. In this regard, in some such embodiments, the apparatus 300 is specially configured by computer program instructions stored thereon, for example in the memory 304 and/or another component depicted and/or described herein, and/or otherwise accessible to the apparatus 300, for performing the operations as depicted and described with respect to the example process 1300. In some embodiments, the specially configured apparatus 300 includes and/or otherwise is in communication with one or more external apparatuses, systems, devices, and/or the like, to perform one or more of the operations as depicted and described. For example, the apparatus 300 may include and/or communicate with one or more external electronic data management system(s), for example the electronic data management system 102 embodied by the specially configured apparatus 200.

The process 1300 begins at operation 1302. In some embodiments, the process 1300 begins after one or more operations of another process, such as the operation 1208 of the process 1200 as depicted and described. Additionally or alternatively, in some embodiments, upon completion of the process 1300 flow proceeds to one or more operations of another process. In other embodiments, the flow ends upon completion of the process 1300.

At operation 1302, the apparatus 300 includes means, such as the input/output circuitry 306, communications circuitry 308, user management circuitry 312, specialized device capabilities circuitry 310, processor 302, and/or the like, to cause updated rendering of the user interface to comprise an alert indicating that a first device capability incapable of performance by the apparatus 300 is preferred or required. As described herein, for example, in some embodiments the device capability is utilized to securely provide information required for further processing the shared electronic data object, submitting an electronic user authorization, and/or the like. Alternatively or additionally, in some embodiments, the device capability is indicated as preferred or required for submitting data of a particular type (e.g., captured image data) for a current step of processing action in processing the shared electronic data object. In one example context, the alert indicates that a camera module is required, but not performable via the apparatus 300, for a current processing action that involves taking a picture of a user identification document for use in validating the identity of the user (e.g., a driver's license, social security card, and/or the like) as part of processing a particular shared electronic data object (e.g., a loan application on behalf of a company). In some embodiments, for example, the apparatus 300 receives the alert as a transmission from the electronic data management system, where the transmission includes information indicating the first device capability is preferred or required for rendering via one or more user interfaces of the apparatus 300. In other embodiments, the apparatus 300 generates and/or causes updated rendering of the alert.

FIG. 14 illustrates a flowchart including operations of an example process for connection channel management in accordance with at least one example embodiment of the present disclosure. Specifically, FIG. 14 depicts an example process 1400 for improved multi-user connection channel management. In some embodiments, the computer-implemented process 1400 is embodied by computer program code stored on a non-transitory computer-readable medium of a computer program product configured for execution to perform the computer-implemented method. Alternatively or additionally, in some embodiments, the example process 1400 may be performed by one or more specially configured computing devices, such as the user computing devices 104 embodied by the specially configured apparatus 300. In this regard, in some such embodiments, the apparatus 300 is specially configured by computer program instructions stored thereon, for example in the memory 304 and/or another component depicted and/or described herein, and/or otherwise accessible to the apparatus 300, for performing the operations as depicted and described with respect to the example process 1400. In some embodiments, the specially configured apparatus 300 includes and/or otherwise is in communication with one or more external apparatuses, systems, devices, and/or the like, to perform one or more of the operations as depicted and described. For example, the apparatus 300 may include and/or communicate with one or more external electronic data management system(s), for example the electronic data management system 102 embodied by the specially configured apparatus 200.

The process 1400 begins at operation 1402. In some embodiments, the process 1400 begins after one or more operations of another process, such as the operation 1206 of the process 1200 as depicted and described. Additionally or alternatively, in some embodiments, upon completion of the process 1400 flow proceeds to one or more operations of another process, such as the operation 1208 of the process 1200 as depicted and described herein. In other embodiments, the flow ends upon completion of the process 1400.

At operation 1402, the apparatus 300 includes means, such as the input/output circuitry 306, communications circuitry 308, user management circuitry 312, specialized device capabilities circuitry 310, processor 302, and/or the like, to initiate a connection channel change with the electronic data management system by establishing a connection with a second connection channel associated with the first user data object. In some embodiments, for example, the apparatus 300 initiates a connection channel change in response to a change on the apparatus 300 of a communication network with which the apparatus 300 is connected. For example, in some embodiments, the user of the apparatus 300 initiates a connection with a new communication network in response to a user interaction updating a network configuration of the apparatus 300. In other embodiments, the connection channel change is initiated in response to one or more hardware and/or physical updates to the apparatus 300, for example plugging into a wired network connection (e.g., an ethernet connection) or disconnecting from a wired network connection. Upon such interactions, the apparatus 300 may reinitiate establishing a connection channel in the manner described herein with respect to operation 1202. In some such embodiments, the second connection channel change is detected by the electronic data management system in response to establishing and/or initiating the second connection channel associated with the first user data object. In other embodiments, as described herein, a connection channel change is initiated in response to a user initiating a connection channel via a second computing device associated with the first user data object.

Embodiments described herein enable dynamic user interfaces that provide the appropriate access to functionality to be utilized by a user. Such a dynamic interface may be updated once or more in response to detected connection channel changes in real-time, and/or at determinable timestamp intervals (e.g., at a particular refresh rate) to further reduce required computing resources utilized to maintain the user interface. Similarly, it should be appreciated that such user interface updating methodologies may be implemented on a plurality of user computing devices, and thus multiple computing devices may update in the same or different manners as appropriate based on a detected connection channel change to maintain a desirable and efficient user experience. In this regard, such embodiments provide improved mechanisms not performed by conventional systems and incapable of such performance due to the nature of connection channel management by such conventional systems.

CONCLUSION

Although an example processing system has been described herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described herein should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory, the at least one memory having computer-coded instructions stored thereon that, in execution with the at least one processor, cause the apparatus to:
    establish, at a first computing device and with an external system, a first connection channel corresponding to a first user data object,
    wherein the first connection channel provides access to first functionality enabling interaction with a shared electronic data object in accordance with a defined order of a set of user-driven actions, the set of user-driven actions comprising a first user-driven action to be performed via second functionality associated with a second user data object before a second user-driven action to be performed via third functionality associated with the first user data object based at least in part on the defined order;
    receive, at the first computing device an indication of a connection channel change, the connection channel change associated with a second connection channel corresponding to the second user data object, the second connection channel established between the external system and an external computing device,
    wherein the connection channel change indicates updating of the first connection channel to enable performance of the second user-driven action before the first user-driven action via the third functionality in response to the connection channel change; and
    in response to receiving the indication of the connection channel change, render, at the first computing device, at least one interface element that enables performance of the third functionality.

2. The apparatus according to claim 1, wherein to cause rendering of the at least one interface element, the apparatus is caused to:
    update, in real-time and in response to the indication of the connection channel change, a user interface to include the at least one interface element that enables performance of the second user-driven action.

3. The apparatus according to claim 1, wherein the apparatus causes rendering of the at least one interface element in response to a determination that the first computing device comprises at least one device functionality.

4. The apparatus according to claim 1, further caused to:
    cause updated rendering, at the first computing device, of the at least one interface element that enables a second performance of the second user-driven action in response to an indication of a rollback performed by the external system.

5. The apparatus according to claim 1, further caused to:
    receive user interaction data engaging the at least one interface element; and
    in response to the user interaction data engaging the at least one interface element, transmit data via the first connection channel indicating performance of the second user-driven action to cause the external system to store the data associated with the shared electronic data object.

6. The apparatus according to claim 1, further caused to:
    cause rendering, at the first computing device, of a user interface, wherein the user interface does not include the at least one interface element,
    and wherein to render, at the first computing device, of the at least one interface element that enables performance of the third functionality, the apparatus is caused to:
        in response to receiving the indication of the connection channel change, update rendering of the user interface to include the at least one interface element that enables performance of the second user-driven action.

7. The apparatus according to claim 1, further caused to:
initiate, via the first computing device, a second connection channel change to a new connection channel associated with the first computing device, the new connection channel associated with new functionality preventing performance of the second user-driven action; and in response to the second connection channel change, cause updated rendering of the at least one interface element to prevent performance of the second user-driven action.

8. A computer-implemented method comprising:
establishing, at a first computing device and with an external system, a first connection channel corresponding to a first user data object, wherein the first connection channel provides access to first functionality enabling interaction with a shared electronic data object in accordance with a defined order of a set of user-driven actions, the set of user-driven actions comprising a first user-driven action to be performed via second functionality associated with a second user data object before a second user-driven action to be performed via third functionality associated with the first user data object based at least in part on the defined order;

receiving, at the first computing device an indication of a connection channel change, the connection channel change associated with a second connection channel corresponding to the second user data object, the second connection channel established between the external system and an external computing device, wherein the connection channel change indicates updating of the first connection channel to enable performance of the second user-driven action before the first user-driven action via the third functionality in response to the connection channel change; and in response to receiving the indication of the connection channel change, rendering, at the first computing device, at least one interface element that enables performance of the third functionality.

9. The computer-implemented method according to claim 8, wherein causing rendering of the at least one interface element comprises: updating, in real-time and in response to the indication of the connection channel change, a user interface to include the at least one interface element that enables performance of the second user-driven action.

10. The computer-implemented method according to claim 8, wherein causing rendering of the at least one interface element is performed in response to a determination that the first computing device comprises at least one device functionality.

11. The computer-implemented method according to claim 8, further comprising: causing updated rendering, at the first computing device, of the at least one interface element that enables a second performance of the second user-driven action in response to an indication of a rollback performed by the external system.

12. The computer-implemented method according to claim 8, further comprising: receiving user interaction data engaging the at least one interface element; and in response to the user interaction data engaging the at least one interface element, transmitting data via the first connection channel indicating performance of the second user-driven action to cause the external system to store the data associated with the shared electronic data object.

13. The computer-implemented method according to claim 8, further comprising: causing rendering, at the first computing device, of a user interface, wherein the user interface does not include the at least one interface element, and wherein rendering, at the first computing device, of the at least one interface element that enables performance of the third functionality comprises: in response to receiving the indication of the connection channel change, updating rendering of the user interface to include the at least one interface element that enables performance of the second user-driven action.

14. The computer-implemented method according to claim 8, further comprising: initiating, via the first computing device, a second connection channel change to a new connection channel associated with the first computing device, the new connection channel associated with new functionality preventing performance of the second user-driven action; and in response to the second connection channel change, causing updated rendering of the at least one interface element to prevent performance of the second user-driven action.

15. A computer program product comprising at least one non-transitory computer-readable storage medium having computer program code stored thereon that, in execution with at least one processor, configures the computer program product for establishing, at a first computing device and with an external system, a first connection channel corresponding to a first user data object, wherein the first connection channel provides access to first functionality enabling interaction with a shared electronic data object in accordance with a defined order of a set of user-driven actions, the set of user-driven actions comprising a first user-driven action to be performed via second functionality associated with a second user data object before a second user-driven action to be performed via third functionality associated with the first user data object based at least in part on the defined order;

receiving, at the first computing device an indication of a connection channel change, the connection channel change associated with a second connection channel corresponding to the second user data object, the second connection channel established between the external system and an external computing device, wherein the connection channel change indicates updating of the first connection channel to enable performance of the second user-driven action before the first user-driven action via the third functionality in response to the connection channel change; and in response to receiving the indication of the connection channel change, rendering, at the first computing device, at least one interface element that enables performance of the third functionality.

16. The computer program product according to claim 15, wherein causing rendering of the at least one interface element comprises:

updating, in real-time and in response to the indication of the connection channel change, a user interface to include the at least one interface element that enables performance of the second user-driven action.

17. The computer program product according to claim 15, wherein causing rendering of the at least one interface element is performed in response to a determination that the first computing device comprises at least one device functionality.

18. The computer program product according to claim 15, further configured for:

causing updated rendering, at the first computing device, of the at least one interface element that enables a second performance of the second user-driven action in response to an indication of a rollback performed by the external system.

19. The computer program product according to claim 15, further configured for:

receiving user interaction data engaging the at least one interface element; and in response to the user interaction data engaging the at least one interface element, transmitting data via the first connection channel indicating performance of the second user-driven action to cause the external system to store the data associated with the shared electronic data object.

20. The computer program product according to claim 15, further configured for:

causing rendering, at the first computing device, of a user interface, wherein the user interface does not include the at least one interface element, and wherein rendering, at the first computing device, of the at least one interface element that enables performance of the third functionality comprises:

in response to receiving the indication of the connection channel change, updating rendering of the user interface to include the at least one interface element that enables performance of the second user-driven action.

\* \* \* \* \*